(12) United States Patent
Varma et al.

(10) Patent No.: US 8,929,501 B2
(45) Date of Patent: Jan. 6, 2015

(54) METHOD AND APPARATUS FOR SYNCHRONIZATION OF DATA AND ERROR SAMPLES IN A COMMUNICATIONS SYSTEM

(75) Inventors: Krishnaraj Varma, San Jose, CA (US); Tony Huang, Germantown, MD (US); Sri Bhat, Boyds, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 109 days.

(21) Appl. No.: 13/482,686

(22) Filed: May 29, 2012

(65) Prior Publication Data
US 2013/0322511 A1 Dec. 5, 2013

(51) Int. Cl.
*H04L 7/00* (2006.01)

(52) U.S. Cl.
USPC ........... 375/372; 375/230; 375/355; 375/316; 375/340; 375/371; 375/354

(58) Field of Classification Search
CPC ................. H04L 25/03057; H04L 2025/0377; H04L 7/0058; H04L 25/03019; H04L 7/0004; H04L 7/005; H04L 7/0033; H04L 7/0041; H04N 5/4401
USPC .......... 375/372, 230, 355, 316, 340, 371, 354
See application file for complete search history.

(56) References Cited

U.S. PATENT DOCUMENTS

| | | | |
|---|---|---|---|
| 4,811,360 A * | 3/1989 | Potter | 375/231 |
| 6,470,030 B1 * | 10/2002 | Park et al. | 370/480 |
| 6,904,273 B2 | 6/2005 | Steber et al. | |
| 6,985,523 B2 | 1/2006 | Sims et al. | |
| 7,196,644 B1 * | 3/2007 | Anderson et al. | 341/118 |
| 7,571,338 B2 * | 8/2009 | Osterling et al. | 713/500 |
| 8,526,542 B2 * | 9/2013 | Kim et al. | 375/321 |
| 8,559,573 B2 * | 10/2013 | Banna et al. | 375/350 |
| 2001/0001616 A1 * | 5/2001 | Rakib et al. | 375/259 |
| 2002/0131528 A1 | 9/2002 | Clewer et al. | |
| 2005/0163209 A1 * | 7/2005 | Fimoff et al. | 375/233 |
| 2010/0296569 A1 * | 11/2010 | Tsai et al. | 375/230 |
| 2011/0037904 A1 * | 2/2011 | Yokokawa et al. | 348/725 |

\* cited by examiner

*Primary Examiner* — Kenneth Lam
(74) *Attorney, Agent, or Firm* — Potomac Technology Law, LLC

(57) ABSTRACT

A method and apparatus for processing input data signals transmitted in a continuous mode, or in a burst mode, of signal transmission, such as in a satellite or a computer network communications system. A receiver receives input data signals and a buffer stores the received input data. Processing circuitry generates frame timing synchronization control signals for writing the frames of the input data for storage, generates timing error control signals corresponding to a processing delay for the input data, for synchronizing reading out the stored data from the buffer based on a timing difference between the timing error control signals and the frame timing synchronization control signals to adjust for an arbitrary delay in processing the input data. The processing circuitry can include a tap gradient update circuit for generating a tap gradient corresponding to the read out data, based on equalizer error signals generated by the processing circuitry.

35 Claims, 9 Drawing Sheets

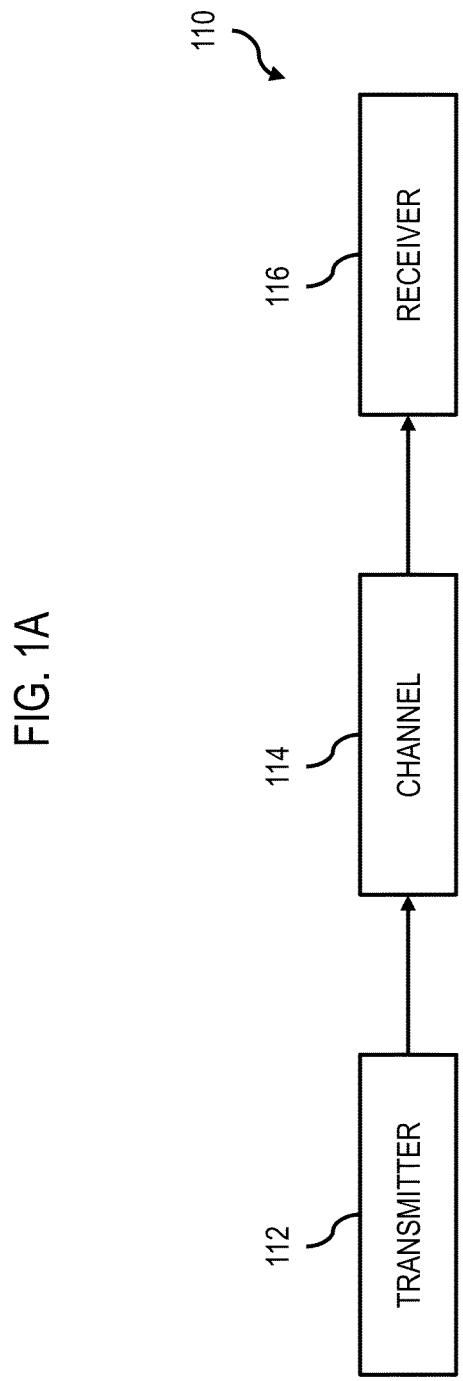

METHOD AND APPARATUS FOR SYNCHRONIZATION OF DATA AND ERROR SAMPLES IN A COMMUNICATIONS SYSTEM

FIELD OF THE INVENTION

The present invention relates to methods and apparatus for demodulation of data signals in a communications system, such as in wide-band satellite communications systems or computer systems. And, more particularly, the present invention promotes equalization of incoming data signals, and relates to synchronizing error samples and data samples to adjust for an arbitrary delay between input data samples and error samples for the input data, as well as to enhance adjusting phase and frequency estimation for carrier recovery and frame-timing recovery, in processing data signals received in a continuous mode, as well as in a burst mode, of data signal transmission.

BACKGROUND

The overall capacities of broadband satellites are increasing exponentially, and such capacity increases present unique challenges in the associated ground system and network designs. The goal of the system designers, system operators, and service providers is to support and provide efficient, robust, reliable and flexible services, in a shared bandwidth network environment, utilizing such high capacity satellite systems. In prior satellite communications systems, the downlink data channels (i.e., transmission of data from the satellite to the satellite terminal) typically utilized bandwidths on the order of 20 MHz or less. In such systems, due to the narrow bandwidth being utilized, there was typically no need to provide for equalization in the demodulator/modem portion of the receiver, as the amplitude and phase distortions of the components where substantially constant.

However, in current systems, such as Digital Video Broadcasting, Second Generation (DVB-S2) satellite communications systems, for example, as the need for additional bandwidth in the downlink data channels of satellite communications systems becomes necessary in order for such systems to provide various applications (e.g., high internet access capability) to end users, there is also a need to provide equalization in the demodulator/modem portion of receiver channel of the system, such as for signal phase and amplitude distortions, which can become significant over a wideband channel. Such amplitude and phase distortions must be negated or compensated for in order for proper receipt and demodulation of the incoming data signal. Additionally, addressing phase and amplitude distortions must also be done at a reasonable cost.

Demodulators for satellite communications systems (e.g., DVB-S2 type demodulators) typically perform equalization of data samples and error samples of the incoming data signals after the carrier recovery. Such equalization is typically performed by a Finite Impulse Response (FIR) filter and the error computation is performed locally after the Carrier Synchronization Module (CSM) block. However, where the demodulator performs the equalization before frame-timing recovery and carrier recovery, as, for example, at a Jupiter terminal of the Jupiter satellite system, a significantly better performance in Unique Word (UW) detection in the Unique Word processor (UWP), and in phase and frequency estimation in the CSM, is possible. Therefore, better carrier recovery typically can result.

Examples of demodulation in satellite communications systems are described in U.S. Pat. No. 6,985,523 to Sims et al., titled "Method and System for Adaptive Equalization for Receivers in a Wide-Band Satellite Communications System," and in U.S. Patent Application Publication No. 2002/0131528 to Clewer et al., titled "System and Method of Parallel Partitioning a Satellite Communications Modem," the entireties of which are incorporated herein by reference. Further an example of automatic gain control and demodulation in satellite communications systems is described in U.S. Pat. No. 6,904,273 to Steber et al., titled "Method and System for Automatic Gain Control in a Satellite Communications System," the entirety of which is incorporated herein by reference.

But, even where the demodulator performs the equalization before frame-timing recovery and carrier recovery, the error computation still takes place after the carrier recovery, which typically results in the introduction of an arbitrary delay between the input samples and the error samples. Thus, a need exists to synchronize the data samples and error samples in relation to equalization of the incoming data signals as to such arbitrary delay, particularly for continuous mode data transmission, as well as for intermittent, or bursty, data transmission in the burst mode of data transmission. And, therefore, a need exists for demodulation methods and apparatus, such as, for example, with Least Mean Squares (LMS) adaptive filtering, that addresses the input data samples and error samples being properly synchronized, in view of an arbitrary delay introduced in processing data signals, such as where a demodulator performs the equalization before frame-timing recovery and carrier recovery, particularly in a continuous mode of data transmission.

Current systems can therefore fail to support, in this regard, efficient, robust, reliable and flexible broadband services, in such shared bandwidth network environments, utilizing such high capacity satellite systems. Achieving efficient, robust, flexible and fast broadband services, in such a high capacity, shared bandwidth, satellite system network, therefore can pose unique challenges to system designers and operators.

Accordingly, there exists a need for cost effective methods and apparatus for equalizing the incoming wideband data signals to compensate for amplitude and phase variations in the demodulator/modem portion of the receiver over a given bandwidth when signals are input for reception and processing, particularly in a continuous mode of data transmission, which promotes increasing accuracy in processing the received signals, effectively maintaining a lock on the data signals after acquisition of the signals for processing the input data, and minimizing degrading the accuracy of phase and frequency estimation for the signal or data processing.

Accordingly, there exists a need for a cost effective method and apparatus for accurate synchronization in processing of data frames transmitted, particularly in a continuous mode of data transmission, from a high capacity, shared bandwidth communications network, such as a satellite communications network, or a computer communications network, that employs a dynamic and flexible architecture, apparatus and methods to synchronize the error samples and the input data samples, which would meet various requirements and desires associated with efficient, robust, reliable and flexible broadband services in a high capacity, shared bandwidth, satellite network, and that would be relatively efficient and automated from a network management and load balancing standpoint.

SOME EXEMPLARY EMBODIMENTS

The present invention relates to methods and apparatus for providing cost effective adaptive equalization of data signals, such as in a demodulator/modem portion of the satellite terminal or a receiver, in a satellite communications network, to mitigate the effects of amplitude and phase nonlinearities contained in the demodulation section of the satellite terminal, such an in a System-on-Chip (SoC) demodulator, and, more particularly, to enhance the accuracy of performance of Unique Word (UW) detection for frame-timing recovery and phase and frequency estimation for carrier recovery of the data signals transmitted, particularly in a continuous mode of data or signal transmission, as well as in a burst, i.e. bursty, mode of data or signal transmission.

According to exemplary embodiments, the aspects of the present invention relate to an apparatus for providing adaptive equalization of a receiver channel of a communications system that receives data signals in a continuous mode, or in a burst mode, of data transmission, such as a satellite terminal of a satellite communications system, and to compensate and adjust for an arbitrary delay resulting from signal or data processing. Additionally, according to exemplary embodiments, reacquisition of frame timing can be enabled, such as where the received data signal or data stream is temporarily interrupted or corrupted, as well as enhancing the ability of the equalizer to re-train its coefficients, such as between periods of continuous service, for example. Aspects of the invention also promote enhancing phase and frequency estimation in a high capacity communications network by synchronizing error samples and data samples of the input data, as well as to enhance adjusting phase and frequency estimation for carrier recovery and frame-timing recovery, such as in shared bandwidth network for signal or data processing, such as, for example, in a satellite network communications system.

According to exemplary embodiments and aspects of the invention, the apparatus comprises a demodulator for a communications system, the demodulator comprising a receiver circuit for receiving an input data stream transmitted in a communications system, the input data stream comprising frames of input data, a frame timing processor circuit for generating frame timing synchronization control signals, the frame timing synchronization control signals for writing the frames of the input data for storage, a carrier synchronization circuit for generating timing error control signals corresponding to a processing delay for the input data, and a buffer circuit for receiving the input data from the receiver, for storing the input data in response to the frame timing synchronization control signals and for synchronizing a reading out of the stored input data based on a timing difference between the timing error control signals and the frame timing synchronization control signals to adjust for an arbitrary delay in processing the input data.

According to exemplary embodiments and aspects of the invention, an apparatus for processing input data, such as by demodulation, further includes a tap gradient update circuit for generating a Tap gradient to correspond to the read out data in processing the input data, based on equalizer error signals for adjusting the Tap gradient generated by the carrier synchronization circuit.

According to exemplary embodiments, the communications system comprises a high capacity, shared bandwidth communications network, such as a satellite communications network or a computer communications network, for example.

According to exemplary embodiments, in an apparatus for processing data signals transmitted in a communications system, the demodulator comprises a demodulator (e.g., a DVB-S2 type demodulator), the filter circuit comprises a Finite Impulse Response (FIR) Equalizer Filter, the frame timing processor circuit comprises a Unique Word processor (UWP), the carrier synchronization circuit comprises a Carrier Synchronization Module (CSM), the buffer circuit comprises an Equalizer Buffer, and the tap updating circuit comprises a Least Mean Squares (LMS) Tap Update circuit. Also, the receiver circuit comprises a Front-End-Signal Processing circuit and a Root-Raised-Cosine Filter (RRC).

According to exemplary embodiments, an apparatus, according to aspects of the invention, receives and processes the input data signals in a parallel format. Further, according to aspects of the invention, the apparatus receives and processes the input data signals by breaking down, or formatting, the input data signals into a plurality of data segments, such as two or more data segments, for signal processing in a continuous mode, or a burst mode, of data signal transmission.

According to exemplary embodiments and aspects of the invention, the buffer circuit, buffer or the equalizer buffer typically includes a predetermined data storage capacity sufficient to store input data corresponding to a maximum arbitrary delay between the input data samples and the error samples resulting from processing of the input. Also, according to exemplary embodiments and aspects of the invention, a range of the variable, arbitrary delay typically accommodated by the equalizer buffer, buffer or buffer circuit in is typically between 1 mega symbol per second to 225 mega symbols per second, such as for a satellite communications system, for example.

Also, according to exemplary embodiments and aspects of the invention, an apparatus for receiving and processing an input data stream comprises a receiver for receiving an input data stream transmitted in a communications system, the input data stream comprising frames of input data, a buffer for storing the input data, and processing circuitry for generating frame timing synchronization control signals for writing the frames of the input data for storage in the buffer, for generating timing error control signals corresponding to a processing delay for the input data, and for synchronizing a reading out of the stored input data from the buffer based on a timing difference between the timing error control signals and the frame timing synchronization control signals to adjust for an arbitrary delay in processing the input data.

According to exemplary embodiments and aspects of the invention, the apparatus further comprises a tap gradient update circuit for generating a Tap gradient to correspond to the read out data in processing the input data, based on equalizer error signals for adjusting the Tap gradient generated by the processing circuitry.

According to exemplary embodiments and aspects of the invention, the timing error control signals comprise one or more of error adjusted frame timing synchronization control signals and error adjusted valid control signals to synchronize error samples corresponding to input data samples for frame timing synchronization to adjust for the arbitrary delay in processing the input data.

According to exemplary embodiments and aspects of the invention, the processing circuitry comprises a System-on-Chip (SoC) demodulator, such as a DVB-S2 type demodulator for a satellite communications system.

According to exemplary embodiments and aspects of the invention, a method for receiving and processing input data signals in a communications system comprises receiving an input data stream transmitted in a communications system, the input data stream comprising frames of input data, demodulating the received input data to process the input data, wherein the demodulation of the received input data comprises, generating frame timing synchronization control signals for writing the frames of the input data for storage, storing the input data based on the generated frame timing synchronization control signals, generating timing error control signals corresponding to a processing delay for the input data, and synchronizing a reading out of the stored input data based on a timing difference between the timing error control signals and the frame timing synchronization control signals to adjust for an arbitrary delay in processing the input data.

According to exemplary embodiments and aspects of the invention, a method further comprises the timing error control signals comprise one or more of error adjusted frame timing synchronization control signals and error adjusted valid control signals to synchronize error samples corresponding to input data samples for frame timing synchronization to adjust for the arbitrary delay in processing the input data.

According to another exemplary embodiment, a method also comprises generating equalizer error signals to adjust a tap gradient to correspond to the read out data in processing the input data.

According to a further exemplary embodiment, a method also comprises demodulating the received input data in a parallelized format. Additionally, according to aspects of the invention, the demodulating comprises processing the input data by breaking down, or formatting, the input data signals into a plurality of data segments, such as two or more data segments, for signal processing in a continuous mode, or a burst mode, of data signal transmission.

According to further exemplary embodiments, the input data stream for processing, such as by demodulation, is transmitted in a continuous mode or a burst mode in a satellite communications system, or in a computer network communications system.

According to exemplary embodiments, a method additionally comprises storing the data by providing for a storage capacity to account for a maximum amount of arbitrary delay in the data signal processing.

Therefore, the methods and apparatus of the invention advantageously address the needs above, as well as other needs, by providing a dynamic and flexible architecture and method for error reduction and improved performance in signal reception in high capacity, shared bandwidth, satellite networks, in a continuous mode, or a burst mode, of data signal transmission, which meets various requirements and desires associated with efficient, robust, reliable and flexible broadband services in a high capacity, shared bandwidth, communications network, such as a satellite network, and that is relatively efficient and automated from a network management and load balancing standpoint. Further, according to aspects of the invention, the methods and apparatus of the invention advantageously promote mitigation of the effects of amplitude and phase nonlinearities, such as can occur in the demodulation section of a satellite terminal, in a cost effective manner, and enhance accurate signal processing by adjusting for an arbitrary delay in processing input data. Additional advantages of the present invention will become apparent to those skilled in the art from the following detailed description of exemplary embodiments and aspects of the invention.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1A, 1B and 1C illustrate communications systems capable of employing an apparatus and methods for synchronization, as well as for equalization, in accordance with various exemplary embodiments;

DETAILED DESCRIPTION

Figure 1B:
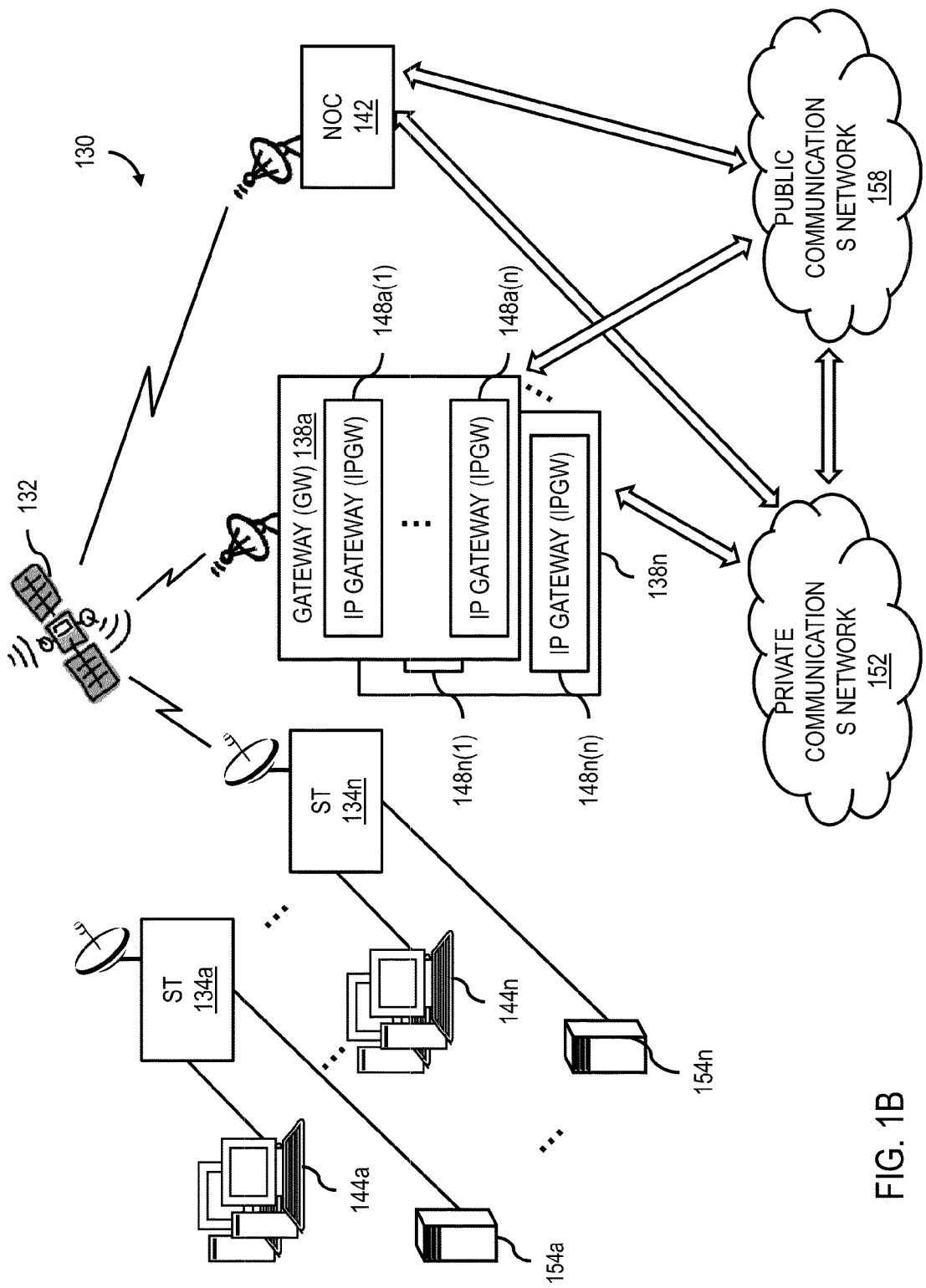

In accordance with an aspect of the present invention, dynamic and flexible architectures, apparatus and methods are provided that promotes equalization of incoming data signals, and that synchronizes error samples and data samples to adjust for an arbitrary delay in processing the input data, as well as to enhance adjusting phase and frequency estimation for carrier recovery and frame-timing recovery, for input data streams received in a continuous mode, as well as in a burst mode, of signal transmission, such as in a satellite communications system or a computer network communications system, which meet various requirements and desires associated with efficient, robust, reliable and flexible broadband services in a high capacity, shared bandwidth, satellite network, and that is relatively efficient and automated from a network management and load balancing standpoint.

In such a shared bandwidth network, for example, where multiple remote nodes access broadband services through one or more aggregation nodes (e.g., gateways), according to various exemplary embodiments, the present architectures, apparatus and methods promote equalization of incoming data signals, and synchronize error samples and data samples to adjust for an arbitrary delay between input data samples and error samples in processing the input data, as well as to enhance adjusting phase and frequency estimation for carrier recovery and frame-timing recovery, for data streams received in a continuous mode, as well as in a burst mode, of signal transmission, such as in a satellite communications system or a computer network communications system, which promotes satisfying various requirements and desires related to the provision of efficient, robust, reliable and flexible high capacity broadband services.

For example, download throughput and download volume usage policy can represent two quantitative service criteria that need to be met in a high-capacity bandwidth transmission in a communications system. The download throughput reflects the maximum speed (in Mbps) which a terminal is configured to sustain in the receive direction from the network, for user data. The download throughput can be based on the service plan to which the terminal is subscribed (e.g., based on the user service subscriptions). The download usage volume is the amount of data in megabytes (MB) or gigabytes (GB) that a terminal is configured to receive from the aggregation node in the download direction before having its throughput throttled (e.g., based on a fair access policy of the service provider). The download usage volume can be based on an option selected by the user when signing up for a service plan. A terminal associates with an aggregation node by selecting a particular node (from a pool of suitable aggregation nodes available to the terminal) for provision of the required services to the terminal. Once the terminal completes an association process according to exemplary protocols, and the aggregation node accepts the association, the terminal becomes associated with the selected aggregation node.

In accordance with one exemplary embodiment, such a shared high capacity bandwidth network transmitting data in a continuous, or a burst, transmission mode, can comprise a broadband satellite communications system, where multiple remote nodes (e.g., satellite terminals (STs)) access broadband services through one or more aggregation nodes (e.g., gateways (GWs) or IP gateways (IPGWs). For instance, different STs subscribe to different services, whereby the STs associate with respective IPGWs that support the respective services of the terminal. An ST would dynamically select an IPGW from an eligible pool of IPGWs that support service configurations and subscriptions that satisfy the service requirements of the ST. The ST associates with the selected IPGW for provision of the required services to the terminal. Once the ST completes an association process, and the IPGW accepts the association, the terminal becomes associated with the selected IPGW.

Figure 1C:
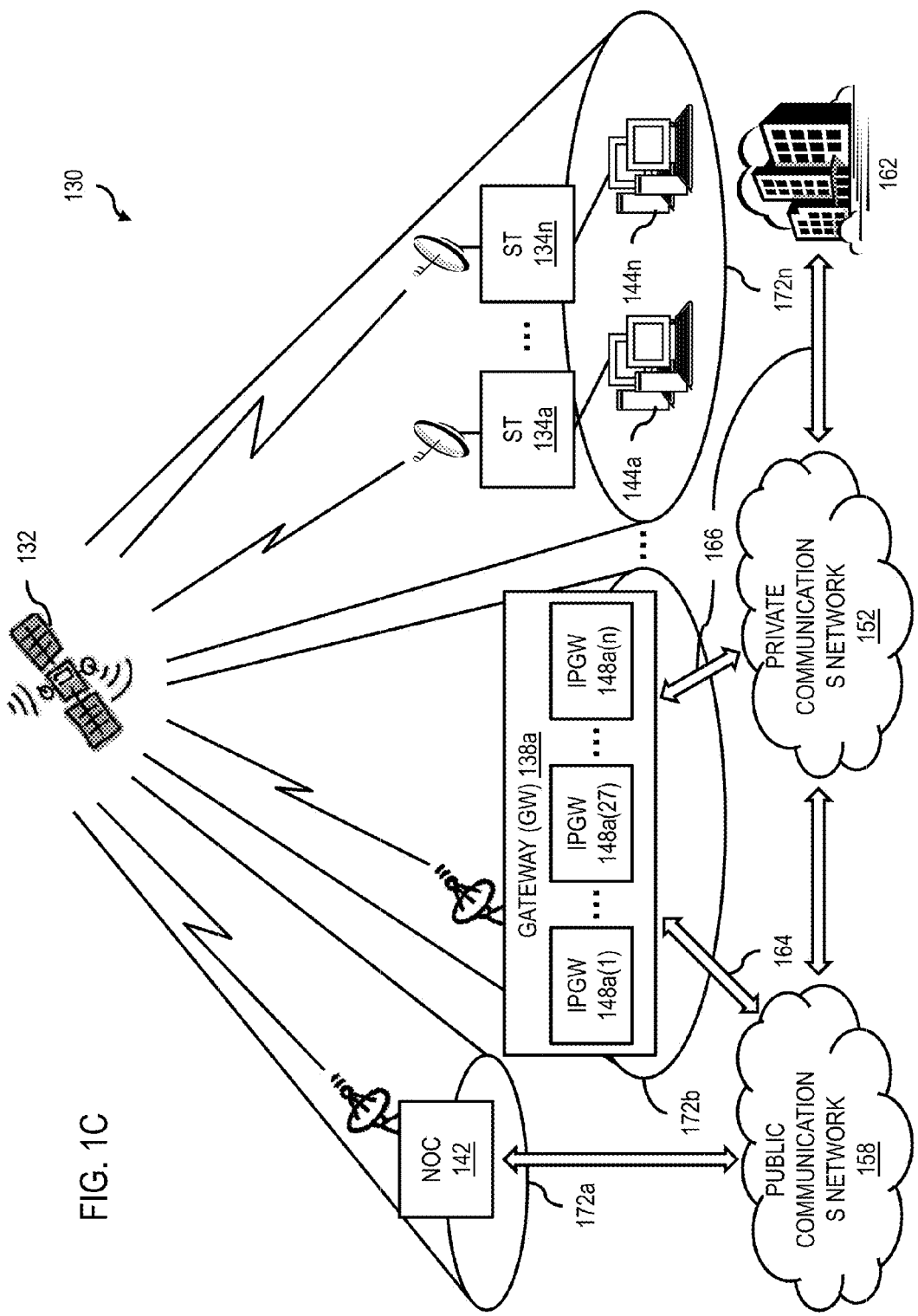

FIGS. 1A-1C illustrate communications systems capable of employing a dynamic and flexible architectures, apparatus and methods that can be utilized in implementing the synchronizing of error samples and data samples to adjust for an arbitrary delay in processing the input data, as well as to enhance adjusting phase and frequency estimation for carrier recovery and frame-timing recovery, in processing data signals received in a continuous mode, as well as in a burst mode, of signal transmission, such as in a satellite communications system, according to various exemplary embodiments of the invention. With reference to FIG. 1A, a digital communications system 110 includes one or more transmitters 112 (of which one is shown) that generate signal waveforms across a communications channel 114 to one or more receivers 116 (of which one is shown). In this discrete communications system 110, the transmitter 112 has a signal source that produces a discrete set of data signals, where each of the data signals has a corresponding signal waveform. These signal waveforms are attenuated, or otherwise altered, by communications channel 114. To combat noise and other issues associated with the channel 114, coding can be utilized. For example, forward error correction (FEC) codes can be employed.

FIG. 1B illustrates an exemplary satellite communications system 130 capable of supporting communications among terminals with varied capabilities, according to exemplary embodiments of the invention. Satellite communications system 130 includes a satellite 132 that supports communications among multiple satellite terminals (STs) 134a-134n, a number of gateways (GWs) 138a-138n, and a network operations center (NOC) 142. The NOC 142 performs the management plane functions of the system 130, while the GWs 138a-138n perform the data plane functions of the system 133. For example, the NOC 142 can perform such functions as network management and configuration, software downloads (e.g., to the STs 134a-134n), status monitoring, statistics functions (e.g., collection, aggregation and reporting), security functions (e.g., key generation, management and distribution), ST registration and authentication, and GW diversity management. The NOC 142 can communicate with each GW via the satellite 132, or via a secure private communications network 152 (e.g., an IPsec tunnel over a dedicated link or a virtual private network (VPN) or IPsec tunnel through a public network, such as the Internet). Additionally, each GW and the NOC can have connectivity to one or more public communications networks, such as the Internet or a PSTN.

According to a further exemplary embodiment, each of the GWs 138a-138n can include one or more gateways (IP-GWs)—whereby the data plane functions are divided between a GW and its respective IPGWs. For example, GW 138a can include IPGWs 148a(1)-148a(n) and GW 138n can include IPGWs 148n(1)-148n(n). A GW can perform such functions as link layer and physical layer outroute coding and modulation (e.g., DVB-S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, and traffic restriction policy enforcement. Whereas, the IPGW can perform such functions as data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing. Further, a GW and respective IPGW can be collocated with the NOC 142. The STs 134a-134n can provide connectivity to one or more hosts 144a-144n and/or routers 154a-154n, respectively. The satellite communications system 130 can operate as a bent-pipe system, where the satellite essentially operates as a repeater or bent pipe. Alternatively, the system 130 can employ a switching or processing satellite supporting mesh communications (point-to-point communications directly between, for example, the two STs 134a and 134n).

In a communications system 130 that employs a processing satellite (e.g., including a packet switch operating, for example, at a data link layer), the system can support direct unicast (point-to-point) communications and multicast communications among the STs 134a-134n and GWs 138a-138n. In the case of a processing satellite, the satellite 132 decodes the received signal and determines the destination ST or STs and/or GWs. The satellite 132 then addresses the data accordingly, encodes and modulates it, and transmits the modulated signal to the destination ST or STs (e.g., ST 134n) and/or GWs (and their respective IPGWs). A demodulator (e.g., a DVB-S2 type) demodulator, according to exemplary embodiments, can be associated with one or more STs (e.g., ST 134n) and/or GWs 138a-138n, in relation to equalization of incoming data signals, and in relation to synchronizing error samples and data samples to adjust for an arbitrary delay between input data samples and error samples for the input data, as well as to enhance adjusting phase and frequency estimation for carrier recovery and frame-timing recovery, in processing data signals received in a continuous mode, as well as in a burst mode, of data signal transmission, according to exemplary embodiments and aspects of the invention. According to exemplary embodiments, the system 130 thereby provides a fully meshed architecture, whereby the STs 134a-134n can directly communicate, via a single hop, over the satellite 132.

In a bent-pipe system of an exemplary embodiment, the satellite 132 operates as a repeater or bent pipe and communications to and from the STs 134a-134n are transmitted over the satellite 132 to and from respective IPGWs associated with particular STs. Further, in a spot beam system, any one spot beam (e.g., beams 172a-172n) operates as a bent-pipe to geographic region covered by the beam. For example, each spot beam operates as a bent pipe communications channel to and from the STs and/or IPGW(s) within the geographic region covered by the beam. Also, for example, several GWs/IPGWs are distributed across the geographic region covered by all spot beams of the satellite 132, where, in a beam in which a GW (and respective IPGWs) are located, only the one GW (and no STs) occupies that beam. Further, each IPGW can serve as an aggregation node for a multitude of remote nodes or STs. The total number of GWs/IPGWs, and the geographic distribution of the GWs/IPGWs, depends on a number of factors, such as the total capacity of the satellite dedicated to data traffic, geographic traffic loading of the system (e.g., based on population densities and the geographic distribution of the STs), locations of available terrestrial data centers (e.g., terrestrial data trunks for access to public and private dedicated networks).

More specifically, with reference to FIG. 1C, for example, for a data communication from ST 134a to a public communications network 158 (e.g., the Internet), the ST 134a can be associated with an IPGW (e.g., IPGW 148a(1)—selected from a pool of IPGWs available to the ST 134a, such as IPGWs 148a(1)-148a(27)—where the pool of IPGWs is a suitable subset of the IPGWs 148a(1)-148a(n) located at the GW 138a). Such STs or GWs can be associated with demodulators (e.g., a DVB-S2 type) demodulator, according to exemplary embodiments, in relation to equalization of incoming data signals, and in relation to synchronizing error samples and data samples to adjust for an arbitrary delay between input data samples and error samples for the input data, as well as to enhance adjusting phase and frequency estimation for carrier recovery and frame-timing recovery, in processing data signals received in a continuous mode, as well as in a burst mode, of signal transmission, according to exemplary embodiments and aspects of the invention. The data is first transmitted, via the satellite 132, from the ST 134a to associated IPGW 148a(1). The IPGW 148a(1) determines the destination as being the Internet 158. The IPGW then repackages the data (e.g., as a TCP/IP communication), and routes the data communication, via the terrestrial link 164, to the Internet 158. Further, in a corporate network, for example, a corporation can deploy various remote STs at remote offices. More specifically, ST 134n, located at a remote corporate location, can desire to securely communicate with the corporate headquarters 162. Accordingly, for a data communication from ST 134n to the corporate headquarters 162, the data is first transmitted, via the satellite 132, from the ST 134n to an IPGW associated with the ST 134n (e.g., IPGW 148a(27)). The IPGW 148a(27) determines the destination as being the corporate headquarters 162. The IPGW then repackages the data (e.g., as an IPsec communication), and routes the IPsec data communication, via the secure terrestrial links 166 (over the private network 152), to the corporate headquarters 162. In the corporate network scenario, a further example can involve a corporate communication from the corporate headquarters to a number of remote sites (e.g., a multicast communication to STs 134a-134n)—where STs 134a-134n are correspondingly associated with the two IPGWs 148a(1) and 148a(27) (e.g., grouped between the two IPGWs based on load balancing and IPGW capabilities). In this scenario, a gateway or router, within the local network of corporate headquarters 162, transmits the data communication, via the secure terrestrial links 166 (over the private network 152), to the IPGWs 148a(1) and 148a(27). The IPGWs determine that the communication is destined for the remote STs 134a-134n, and package the data as a multicast communication addressed to the community of STs 134a-134n. The IPGWs then transmit the data communication, via the satellite 132, for decoding by the community of STs 134a-134n. Accordingly, the satellite 132 of such a system acts as a bent pipe or repeater, transmitting communications between the STs 134a-134n and their respective associated IPGWs 148a-148n.

Also, for example, the terminals are configured with information regarding what service they receive. For the purposes hereof, this information is collectively termed the Service Parameter Information. The Service Parameter Information can include, for example: an identifier indicating the download throughput that the terminal should be able to receive; an identifier indicating the download usage volumes per priority that the terminal should be able to receive; one or more identifiers indicating various services that the terminal could receive, such as, Voice over IP, Video Streaming, Video Conferencing, Multicast IP Services, a static IPv4IPv6 subnet, if the terminal is subscribed to a static IPv4/IPv6 plan. A terminal can use such configuration information to match against the capabilities being reported by the IPGWs on the outroute stream of the terminal. Based on the receipt of a capabilities multicast message (CMM) from a given IPGW, the terminal can add that IPGW to the pool of eligible IPGWs capable of supporting the services to which the terminal is configured/subscribed. This allows the IPGW to be selected by terminals for Association. As long as terminals receive the CMM from this IPGW and the IPGW status does not indicate that the IPGW is not accepting associations, terminals can associate with the IPGW. If the CMM stops being received or the IPGW status in the CMM indicates that it is no longer in service, terminals remove the IPGW from their eligible pool and terminals already associated with the IPGW lose their association with the IPGW.

Further, for example, the IPGW is configured with information regarding the services it supports. Such information can include: identifier(s) indicating the download throughput(s) that the IPGW supports along with the download throughput(s) to which the identifier(s) map; the download usage volumes that the IPGW provides; the configuration for the services that the IPGW provides, such as classification and traffic policing rules for voice and video services, multicast IP and conditional access information for multicast IP services; and whether the IPGW supports static IPv4/IPv6 subnets and, if so, the static IPv4/IPv6 subnets it services. As soon as the IPGW comes to an operational state where the IPGW is ready to service terminals, the IPGW starts multicasting a capabilities message (CMM).

The IPGW periodically transmits its capabilities multicast message (CMM). The CMM indicates the loading, service capabilities, and current state of the IPGW. The CMM is multicast from each IPGW to every terminal in the outroute stream on which the IPGWs traffic is transmitted. Each IPGW periodically multicasts the CMM, provided that the IPGW has a service signature key, is in a service state (e.g., not in a maintenance state), and has a configuration related to capabilities. A service signature key is used in providing a signature, which serves to protect against tampering with the service parameter information of an ST in an attempt to upgrade the service plans of the ST over and above the service plans to which the ST is subscribed. While each IPGW sends the CMM out at a similar periodicity, the periodicity is configurable, and synchronization is not required across IPGWs as to when they actually send the CMM. Under certain conditions (addressed below), an IPGW can send the CMM more frequently than the standard periodicity. Further, each IPGW typically has a particular configuration that allows it to report service information (e.g., capabilities of the IPGW) in a message (e.g., the CMM) to the STs. Anytime an IPGW receives a configuration update that changes its service configuration or capabilities, the IPGW promptly transmits a new CMM reporting the updated service configuration.

For example, each CMM can contain an alphanumeric string serving as a logical identifier (ID) for the IPGW. The logical identifier can be accessible by a user of the ST or a customer service system in order to facilitate reporting of outages or service issues with respect to a particular IPGW. The CMM can also contain a data WAN IP address of the IPGW, which serves as the IP address through which STs communicate with the IPGW. The CMM can also contain a current loading metric, which indicates a relative loading level of the IPGW compared to other IPGWs in the same IPGW pool, and an IPGW service status indicator (e.g., out of service, degraded, normal operation). Reporting of status other than normal, for example, facilitates faster re-association time (as opposed to a termination of the transmission of the CMM messages from the IPGW), and the provision of information for conveying conditions where service can be degraded. The CMM can also contain a Last Reboot Timestamp, which conveys the time at which the IPGW last rebooted. Accordingly, knowledge of the last reboot time of the IPGW would permit the ST to recover in a more efficient and timely manner, as opposed to waiting for an association timeout. In other words, if an ST determines that the last reboot time of an IPGW with which the ST is associated is more recent than the time of association, then the IPGW will no longer recognize the association with that ST (the association would have been terminated by the IPGW reboot). The CMM can also contain a Change Sequence Number, which reflects a version or change status of the IPGW (e.g., the Change Sequence Number can consist of a monotonically increasing number that is changed when static information within the CMM changes). The Change Sequence Number notifies the ST as to when the CMM static fields have changed, so that the ST need not be burdened with parsing most of the CMM when static fields have not changed. In accordance with a further embodiment, the CMM can include information reflecting the web acceleration servers (e.g., PEP backbone servers) available through the respective IPGW, along with current load information for each of the servers. In such a case, the STs can further load balance across the web acceleration servers by associating with an IPGW that would provide access to a suitable web acceleration server that is not overloaded.

Figure 7:
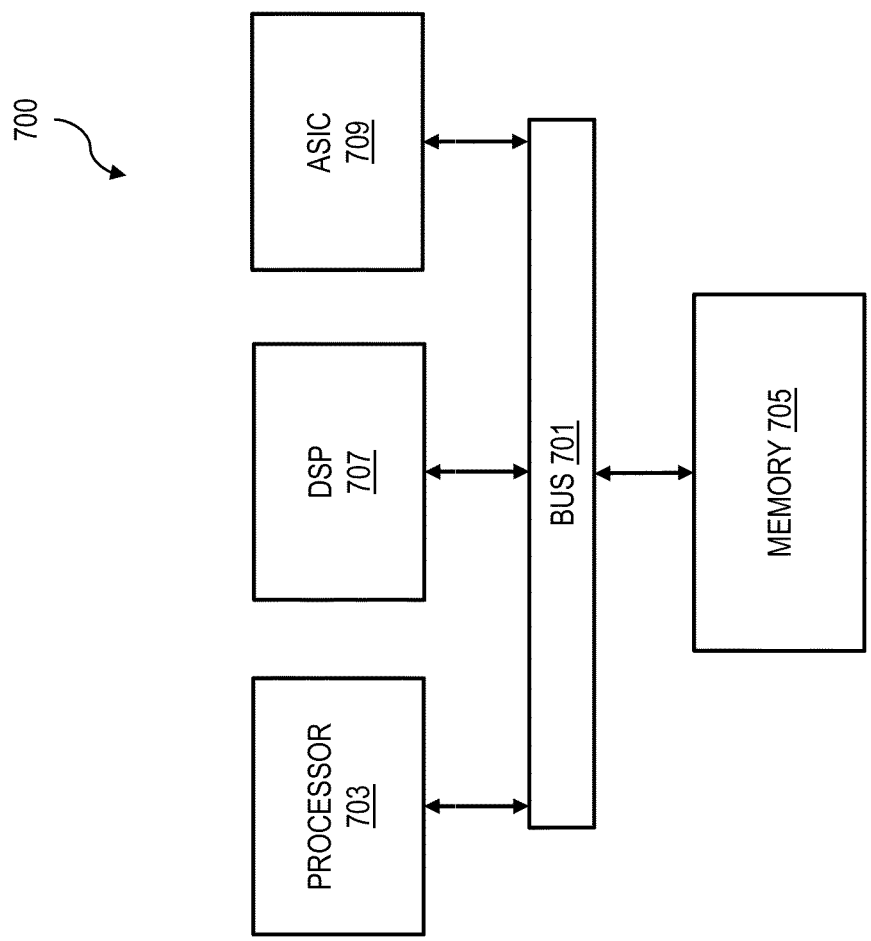
FIG. 7 depicts a block diagram of a chip set that can be utilized in implementing architectures, apparatus and methods, in accordance with exemplary embodiments.

The architectures, apparatus and methods for equalization of incoming data signals, and for synchronizing error samples and data samples to adjust for an arbitrary delay in processing the input data, as well as to enhance adjusting phase and frequency estimation for carrier recovery and frame-timing recovery, in processing data signals received in a continuous mode, as well as in a burst mode, of signal transmission, such as in a satellite communications system or a computer network communications system, according to exemplary embodiments and aspects of the invention, can be implemented, at least in part, by one or more chip sets, including one or more processors and memory, as illustrated in FIG. 7 (showing one such processor). The chip set 700 can be incorporated into the STs and/or GWs/IPGWs, and as such, the chip set 700 provides a means for accomplishing various parts of the algorithms and protocols herein described and illustrated. Further, different aspects of such algorithms and protocols can be allocated to the components of the chip set, as would be prudent based on design choices that would be apparent to one of skill in the art.

Figure 2:
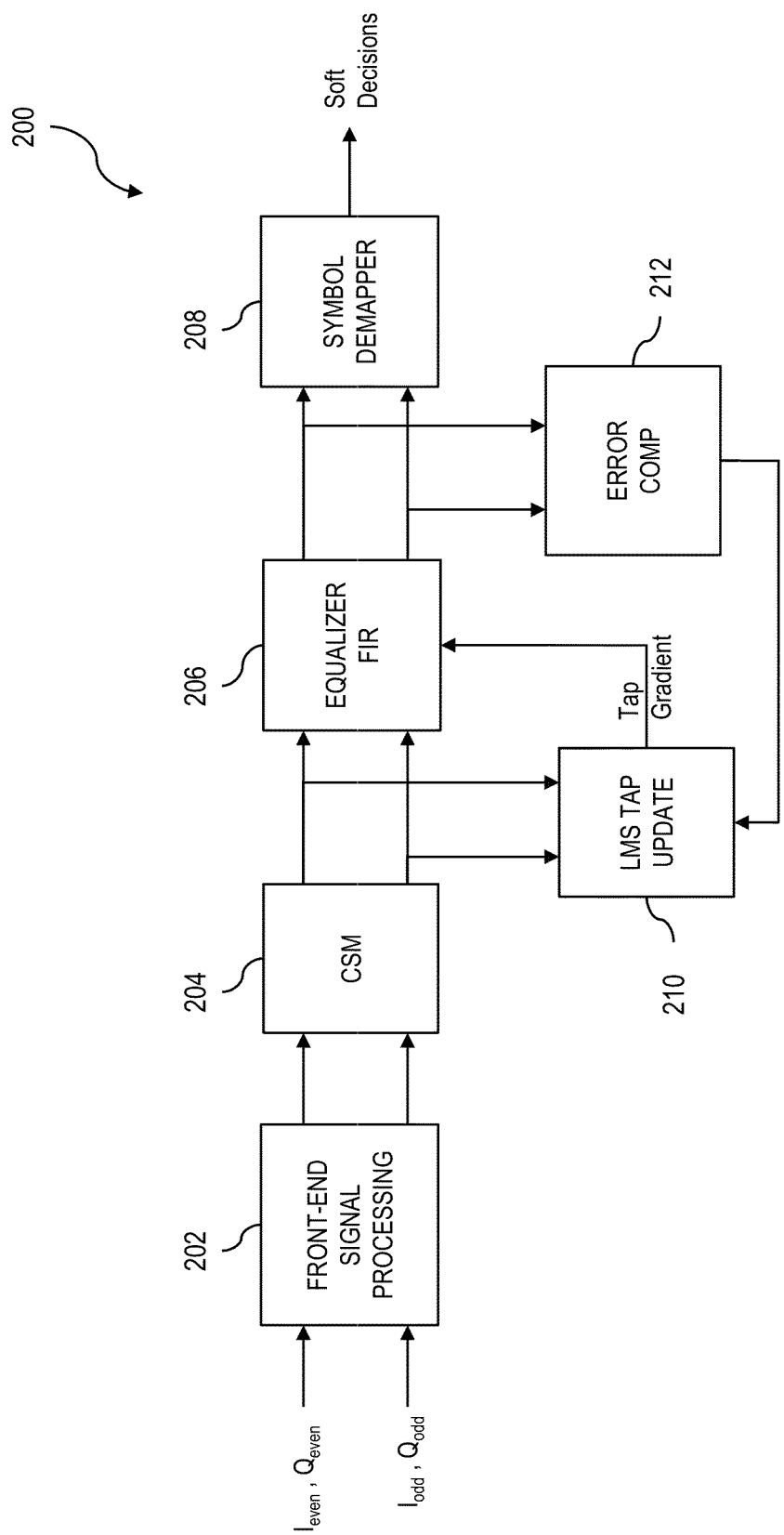
FIGS. 2 and 3 illustrate block diagrams of exemplary demodulators, in accordance with exemplary embodiments.

FIG. 2 illustrates a block diagram of a demodulator 200 (e.g., a DVB-S2 type demodulator), in accordance with an exemplary embodiment, for receiving and processing of transmitted data signals, where the equalizer filter is located after the carrier synchronization module generating a relatively fixed delay for synchronization of error and data samples of the received data.

Referring to the circuit diagram of the demodulator of FIG. 2, in the demodulator 200, the channel equalization is performed after the carrier recovery. Therefore, the input data, $I_{even}, Q_{even}$ and $I_{odd}, Q_{odd}$, proceeds through the receiver, e.g. the Front-end-Signal processing circuit 202, to the Carrier Synchronization Module (CSM) circuit 204. And the error computation is performed locally at the output of the Equalizer Finite Impulse Response (FIR) filter circuit 206 by the error computation circuit 212.

From the Equalizer FIR filter circuit 206, the error at the output of Equalizer FIR filter circuit 206 is determined by the Error Computation circuit 212. The determined error from Error Computation circuit 212 is provided to a Least Mean Squares (LMS) Tap Update circuit 210. The LMS Tap Update Circuit 210 generates a Tap gradient based on the determined error at the output of the Equalizer FIR Filter circuit 206, received from the Error Computation circuit 212. The Tap gradient from the LMS Tap Update circuit 210 is input to the Equalizer FIR filter circuit 206 to change its Tap values to adjust for the error introduced in the Equalizer FIR filter circuit 206. The output data from the Equalizer FIR filter circuit 206 is provided to a Symbol Demapper circuit 208 to demodulate the input symbols into data bits and to also provide soft-decisions.

As noted from the demodulator 200 of FIG. 2, the Equalizer FIR filter circuit 206 and its error are localized in generally the same area in the circuit of demodulator 200. Therefore, in the demodulator 200 of FIG. 2, the delay between the input data samples and the error samples is typically always the pipeline delay of the Equalizer FIR filter circuit 206. Also, the amount of such delay is a typically known, relatively fixed or constant delay, determined from the design of the demodulator. Thus, in the demodulator 200 of FIG. 2, where the Equalizer FIR filter circuit 206 is located after the CSM circuit 204, typically a problem does not exist with regard to synchronizing the input data samples with the error samples in that an arbitrary delay is not typically present.

Figure 3:
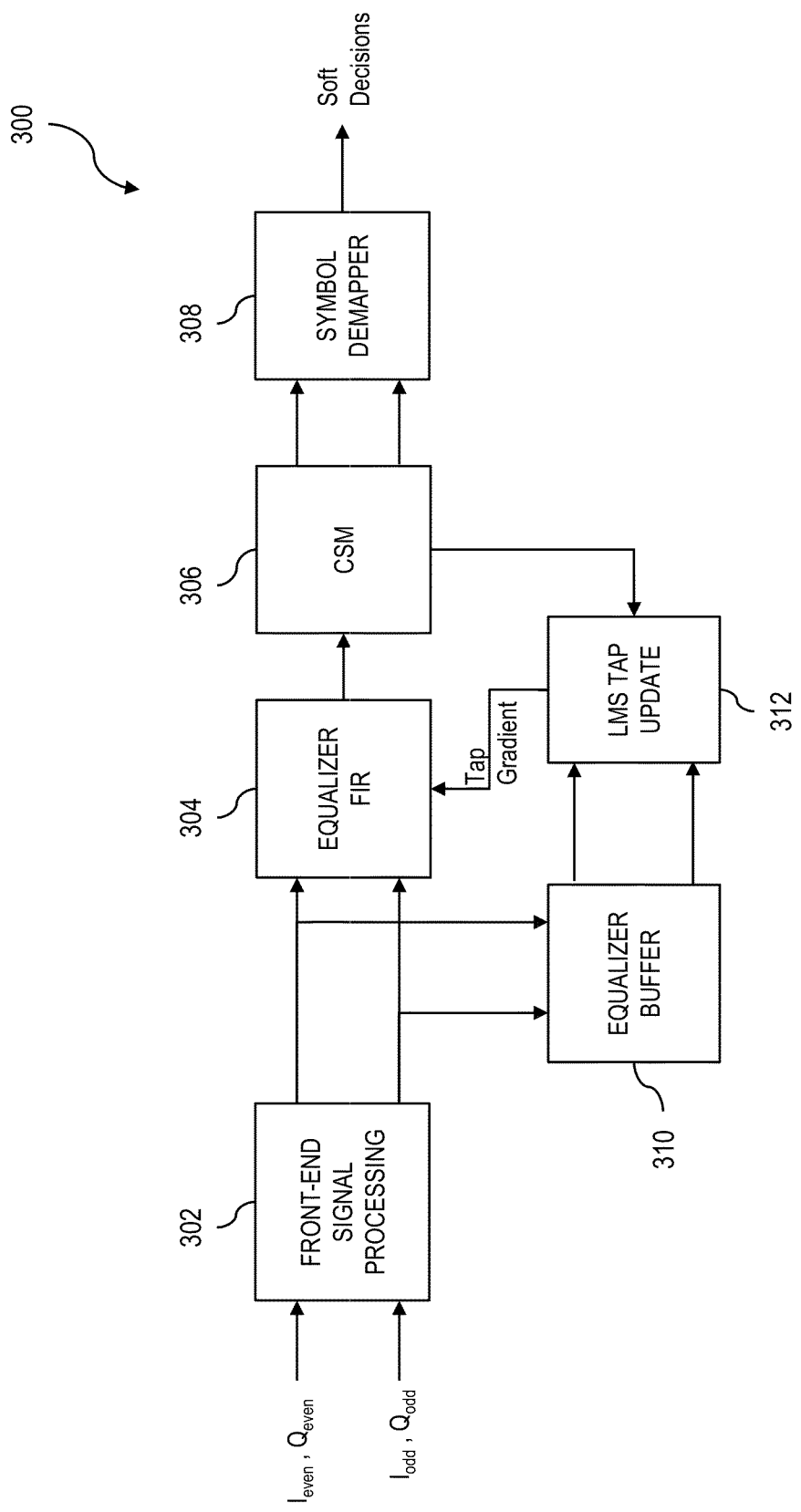

FIG. 3 illustrates a block diagram of a demodulator 300 (e.g., a DVB-S2 type demodulator), in accordance with an exemplary embodiment, for receiving and processing of data signals, in an arrangement where the equalizer filter is located before the carrier synchronization module that typically generates an arbitrary delay in signal processing presenting needs as to synchronization of error samples and data samples of the received data.

Referring to FIG. 3, in the demodulator 300, the input data, $I_{even}, Q_{even}$ and $I_{odd}, Q_{odd}$, proceeds through a receiver circuit, the Front-end-Signal Processing circuit 302, and is stored in the Equalizer Buffer circuit 310 associated with the Equalizer FIR filter circuit 304. The Equalizer FIR filter circuit 304 in the demodulator 300 of FIG. 3 has been moved to before the CSM circuit 306, in contrast to the demodulator 200 of FIG. 2. As such, the CSM circuit 306 acts on the channel equalized symbols from the Equalizer FIR filter circuit 304, typically promoting relatively better carrier recovery.

Based on the output of the CSM circuit 306, of the demodulator 300, timing error correction occurs, whereby an arbitrary delay is introduced between the input samples and the error samples, resulting from block by block processing within the CSM circuit 306. In this regard, in the demodulator 300 of FIG. 3, the error comes after the CSM circuit 306, and there is an arbitrary delay from where the error comes in and when the input data samples come in on the input side of the Equalizer FIR Filter circuit 304. Such arbitrary delay typically affects the synchronization between the error samples and the input data samples. Unlike the fixed, known delay of the demodulator 200 of FIG. 2, this processing delay from the CSM circuit 306 is arbitrary and typically depends on one or more of the symbol-rate, the length of the frame, and pilot-presence, for example. Pilot presence, results from a pilot symbol being inserted into the data stream, where in a "pilot-off" mode the data is transmitted back to back, and in a "pilot-on" mode a special known symbol is inserted between data groups or samples in the transmitted data stream, such as to indicate data groups or for timing, for example.

Figure 4:
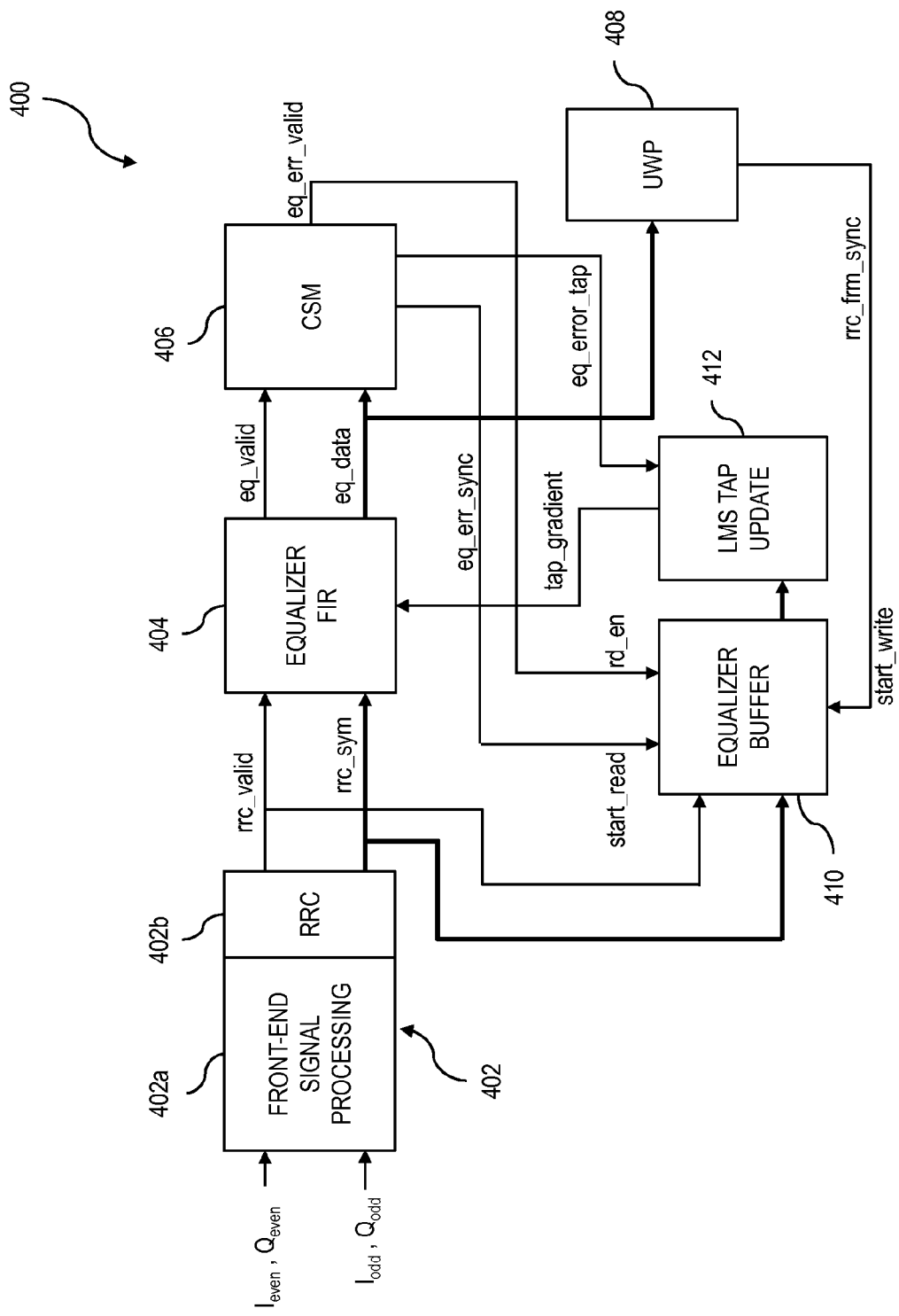
FIG. 4 illustrates a block diagram of an exemplary demodulator, wherein the equalizer filter is located before the carrier synchronization module, for synchronizing error samples and data samples to adjust for an arbitrary delay in processing the input data, in accordance with exemplary embodiments.

In the tap in the demodulator 200 in FIG. 2, in contrast to the demodulator 300 in FIG. 3 and in contrast to the demodulator 400 in FIG. 4, the symbol rate in demodulator 200 is constant and a known delay occurs which is typically just offset error based on the known delay. Where the delay is not constant, however, such as in the demodulators 300 and 400 in FIGS. 3 and 4, the input data samples have to be lined up with the corresponding error samples in order to determine the Tap update. While the LMS Tap Update Circuit 312 in the demodulator 300 of FIG. 3 generates a Tap gradient to the Equalizer FIR Filter 304 to change its Tap values to adjust for the error introduced from the error information provided by the CMS circuit 306, the generated Tap gradient in the demodulator 300 does not relatively effectively take into consideration the arbitrary delay resulting from processing in the CSM circuit 306.

Therefore, in the signal processing in the demodulator 300 of FIG. 3, the input data samples are not properly synchronized with the error samples, typically resulting in performance degradation. And when the data blocks stored in the Equalizer Buffer 310 for some amount of time are then processed, errors typically can result in the processing in view of arbitrary delay in processing introduced by the CSM circuit 306. Such arbitrary delay from the CSM circuit 306 can also affect the Symbol Demapper circuit 308 to demodulate the input symbols into data bits, as well as affecting providing soft-decisions from the Symbol Demapper circuit 308.

Exemplary methods and apparatus, according to aspects of the invention, will now be described with reference to FIGS. 4 and 5 as to promoting equalization of incoming data signals, and synchronizing error samples and data samples to adjust for an arbitrary delay in processing the input data, as well as to enhance adjusting phase and frequency estimation for carrier recovery and frame-timing recovery, in processing data signals received in a continuous mode, as well as in a burst mode, of data signal transmission. Also, the exemplary methods, apparatus and aspects of the invention, such as illustrated and described with respect to FIGS. 4 and 5, can be implemented in conjunction with, for example, the chip set 700, including the processor 703 and memory 705, or by the computer system 600, including the processor 603 and main memory 605, incorporated in or used with the demodulator 400, for example.

As is evident, one of ordinary skill in the art would appreciate various design implementation details and functionality for exemplary demodulators 200, 300 and 400, as illustrated in FIGS. 2-4. However, as to the additional novel features, functions, elements and aspects of the invention described and illustrated in the exemplary embodiments herein, such as with respect to the exemplary demodulator 400 of FIG. 4 and the exemplary flow process of FIG. 5, such novel aspects of the invention can be implemented with the knowledge and guidance of the disclosure herein in view of the generally known designs and functions of such demodulators. For example, an exemplary equation for the Equalizer FIR Filter modules of FIGS. 2, 3 and 4 may be $y(n)=w^H(n)*u(n)$, an exemplary equation for the error signal to the LMS Ta Update of FIGS. 2, 3 and 4 may be $e(n)=d(n)-y(n)$ (where $d(n)$ reflects the delay), and an exemplary equation for the LMS Tap Update modules of FIGS. 2, 3 and 4 may be $\hat{w}(n+1)=\hat{w}(n)-\mu*u(n)*e*(n)$.

FIG. 4 illustrates a block diagram of an exemplary demodulator 400 (e.g., a DVB-S2 type demodulator), in accordance with an exemplary embodiment, configured whereby the equalizer filter is located before the Carrier Synchronization Module, which results typically in an arbitrary delay in processing the input data and that, according to aspects of the invention, the exemplary demodulator 400 synchronizes error and data samples of the received input data to adjust for the arbitrary delay in processing the input data, in accordance with exemplary embodiments and aspects of the invention.

Figure 5:
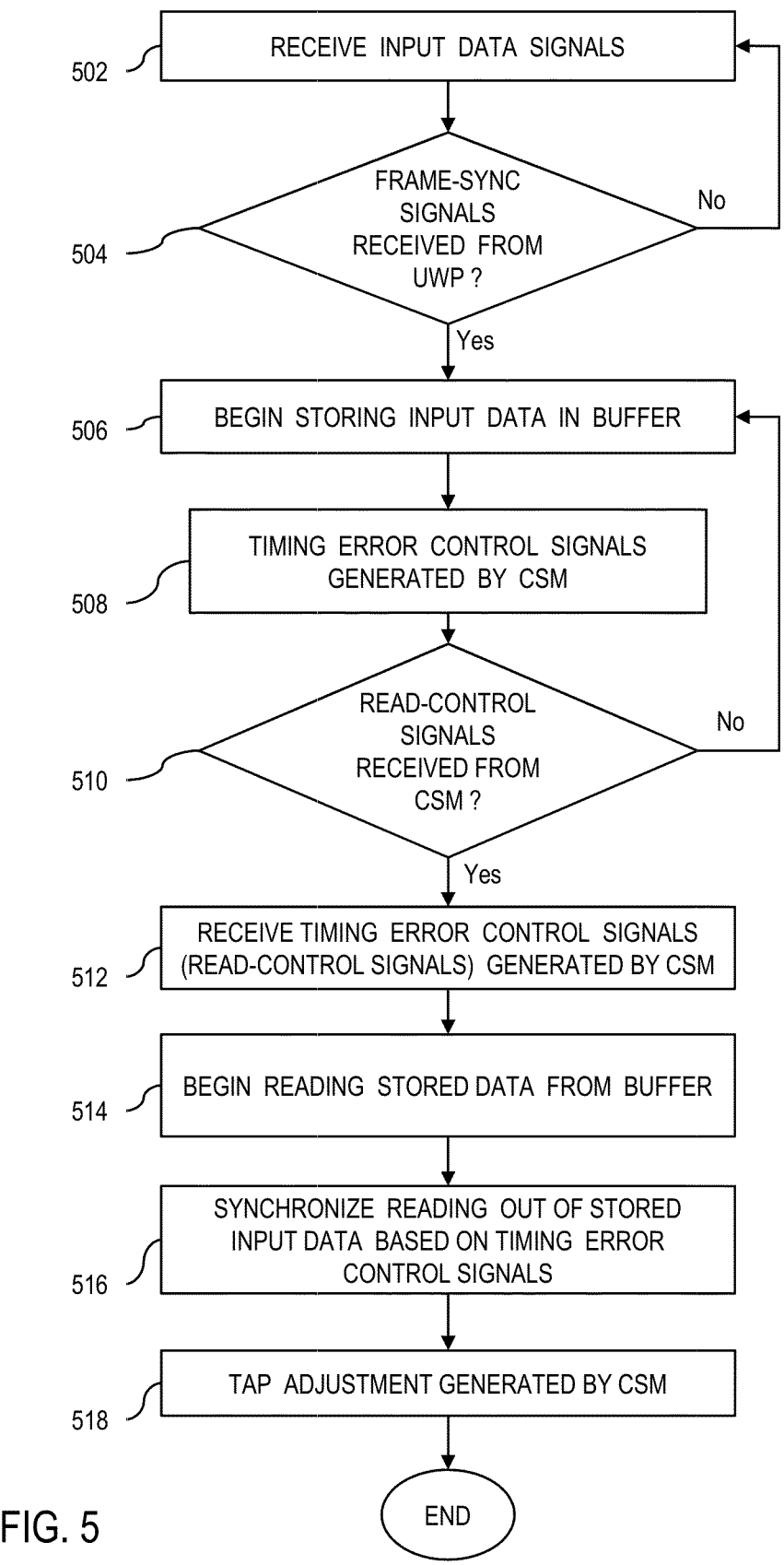
FIG. 5 illustrates a flow chart of an exemplary algorithm, for synchronizing error samples and data samples to adjust for an arbitrary delay in processing the input data, as well as to enhance adjusting phase and frequency estimation for carrier recovery and frame-timing recovery, in accordance with exemplary embodiments.

FIG. 5 illustrates a flow chart of a process for equalization of incoming data signals, and for synchronizing error samples and data samples to adjust for an arbitrary delay in processing for the input data, as well as to enhance adjusting phase and frequency estimation for carrier recovery and frame-timing recovery, in processing data signals received in a continuous mode or a burst mode, in accordance with exemplary embodiments.

Referring to FIGS. 4 and 5, according to exemplary embodiments, the demodulator 400 (e.g., a DVB-S2 type demodulator) facilitates synchronization between the input data samples and error samples with an arbitrary delay in processing between them. The demodulator 400, receives and processes data signals, $I_{even}$, $Q_{even}$ and $I_{odd}$, $Q_{odd}$, received in a continuous mode, or in a burst mode, of signal transmission, such as from a satellite or a gateway GW associated with satellite, such as in a parallelized format, as illustrated in FIG. 4. Also, according to aspects of the invention, the received data in the data stream can be transmitted in either a "pilot-on" or a "pilot-off" mode, for example. Although a parallelized format is illustrated for the data transmission and reception in FIG. 4, the input data signal could be further broken down into a plurality of segments greater than two (2), and the circuitry within the demodulator 400 modified accordingly to process such plural data segments, according to aspects of the invention.

Continuing with reference to FIGS. 4 and 5, the process beings at Step 502 where input data signals are received by the demodulator 400 as an input data stream transmitted in a communications system, the input data stream including frames of input data. The demodulator 400 includes a receiver or receiver circuit 402 for receiving input data signals, such as including a Front-end Signal processing circuit 402a and a Root-Raised-Cosine-Filter (RRC) circuit 402b, for performing matched filtering on the received input data. The receiver circuit 402 generates control pulse signals rrc_valid for the input data and outputs corresponding symbols rrc_sym in the input data stream, which symbols can represent or convey one or several bits of data in the received data transmission. The control pulse signals rrc_valid indicates the corresponding symbols of data pulses are valid. The control signals (rrc_valid) and the corresponding symbols of data (rrc_sym) from the receiver circuit 402 are provided to the filter or filter circuit 404, such as including Equalizer finite impulse response (FIR) Filter circuit 404. The receiver circuit 402 is associated with the Equalizer FIR filter circuit 404. The receiver circuit 402 outputs the data and corresponding symbols to a buffer, equalizer buffer, or buffer circuit 410, such as including an Equalizer Buffer circuit 410, for storing the input data. The Equalizer FIR filter circuit 404, for example, typically includes an equalization filter, for filtering the input data to adjust the input data for one or more of phase and amplitude distortions.

The Equalizer FIR filter circuit 404 filters the input data, and generates channel equalized symbols of data for the input data (eq_data), corresponding to the symbols of data from the Equalizer FIR filter circuit 404, and generates equalized valid control signals (eq_valid), indicating that the corresponding channel equalized symbols of data from the Equalizer FIR filter circuit 404 are valid.

The generated channel equalized symbols of data (eq_data) and the equalized valid control signals (eq_valid), from the Equalizer FIR Filter circuit 404, are input to a carrier synchronization circuit 406, such as including a carrier synchronization module (CSM) circuit 406. The channel equalized symbols of data (eq_data), from the Equalizer FIR filter circuit 404 are also provided to a frame synchronization processor circuit 408 (e.g., a Unique Word Processor (UWP) module). The UWP 408 analyzes the input data to determine the start of a frame, the data being divided into frames which are packets of information, and generates the frame timing synchronization control signal pulses (rrc_frm_sync) for synchronization with the frames of the input data. The UWP circuit 408 locates a unique word at the beginning of each frame, which signals the start of a data frame. The UWP circuit 408 generates the frame timing synchronization control signals, as cues to the Equalizer Buffer circuit 410, to indicate the start of the frames for the data from the RRC circuit 402b of the receiver 402 output to the Equalizer Buffer circuit 410, thereby indicating to the Equalizer Buffer circuit 410 to start saving the corresponding frames of the input data.

The UWP circuit 408 identifies the unique word segment of the received input data, and thereby synchronizes with the beginning of the data frame. The UWP circuit 408 then generates and outputs start_write control signals, as frame timing synchronization control signals, rrc_frm_sync (Frame-Sync signals), to the Equalizer Buffer circuit 410 to trigger the start of storing the input data in the Equalizer Buffer circuit 410. In other words, upon receipt of the start_write control signals the Equalizer Buffer circuit 410 can determine the corresponding first data sample, as well as corresponding subsequent data samples for storage in the Equalizer Buffer circuit 410. Accordingly, with reference to FIG. 5, the Equalizer Buffer circuit 410 of the demodulator 400 continues receiving the input data signals (Step 502), concurrently monitoring for receipt of the frame timing synchronization control signals, i.e. rrc_frm_sync start_write signals, from the UWP circuit 408 (Step 504), at which time, the Equalizer Buffer circuit 410 begins storing the input data in the Equalizer Buffer circuit 410 (Step 506). If the frame timing control signals are not received at Step 504, the process returns to Step 502.

As mentioned previously, the CSM circuit 406 receives from the Equalizer FIR filter circuit 404 the channel equalized symbols of data (eq_data) and the equalized valid control signals (eq_valid), indicating that the corresponding channel equalized symbols of data from the Equalizer FIR filter circuit 404 are valid. At Step 508, based on the channel equalized symbols of data (eq_data) and equalized valid control signals (eq_valid) received from the Equalizer FIR filter circuit 404, the CSM circuit 406 generates the timing error control signals (e.g., the eq_err_sync error adjusted frame timing synchronization control signals), which indicate the start of frames for the error signals to adjust for an arbitrary delay in processing the input data samples for synchronizing the error samples and the data samples to adjust for the arbitrary delay between input data samples and error samples for the input data, as well as to enhance adjusting phase and frequency estimation for carrier recovery and frame-timing recovery.

Also, for example, after the frame timing has been established, the CSM circuit 406 can take some time to determine the error values need to adjust, or discipline, the equalizer coefficients, which typically is function of the current frame type of the input data being processed, but can also be variable. As such, according to aspects of the invention, the exemplary methods and apparatus can advantageously enable the ability to operate the equalizer, such as Equalizer FIR filter circuit 404, even when the delay in processing in the CSM circuit 406 is variable. When the CSM circuit 406 is done with determining the error values, it provides, or gives back, the error values to the Equalizer FIR filter circuit 404. The Equalizer FIR filter circuit 404 can then use the received error information, and the input data it has been storing since the UWP circuit 408 determined the beginning of the correspond frames of data, to then determine an update to its FIR filter coefficients, such as by a tap adjustment through the least mean squares (LMS) Tap Update circuit 412, as discussed herein, for example. According to aspects of the invention, in that the LMS Tap Update circuit 412, which provides the error values for updating the Equalizer FIR filter circuit 404's FIR filter coefficients, as well as the UWP circuit 408, which identifies the beginning of corresponding frame of data, sit downstream of the Equalizer FIR filter circuit 404, enhanced improved signal quality from Equalizer FIR filter circuit 404 is enhanced and promoted, such as where the FIR filter's coefficients are kept up to date, for example.

The timing error control signals (eq_err_sync error adjusted frame timing synchronization control signal pulses) indicate the start of frames for the error signals. For corresponding frames there is a set of error signals, and the eq_err_sync error adjusted frame timing synchronization control signal pulses correspond to a source sample for corresponding data frames. The error adjusted frame timing synchronization control signal pulses (eq_err_sync) from the CSM circuit 406 are also output to the Equalizer Buffer circuit 410 as start read-control signals (start_read—Read-Control signals), to start reading corresponding input data from the Equalizer Buffer circuit 410. The timing error control signals can also include as Read-Control signals error adjusted valid control signal pulses (eq_err_valid) which indicate valid timing error control signals for corresponding frames of data. The error adjusted valid control signal pulses (eq_err_valid) are also output to the Equalizer Buffer circuit 410 as read enable control signals (rd_en) for reading stored input data from the Equalizer Buffer circuit 410.

The Equalizer Buffer 410 facilitates the storage of enough input data to accommodate for any delay between the eq_err_sync signal and the rrc_frm_sync signal from the UWP. Accordingly, the system need not otherwise account for the exact timing of the eq_err_sync signal with respect to the rrc_frm_sync. Further, the eq_err_valid signal is qualified with the clock. The signal is high whenever a new error value is ready to be read out from the CSM. The frequency of the reading out of a new error value is dependent on the ratio between the clock rate and the highest symbol rate. In other words, the eq_err_valid signal is high whenever an error value is available on a particular clock period. According to one embodiment, for example, with a clock rate of 240 MHz and a highest symbol rate of 255 MHz (or Msps), a new error value will be ready at almost every clock pulse.

Similarly, at Step 510, the Equalizer Buffer circuit 410, such as in conjunction with a processor associated with the demodulator 400, concurrently monitors for receipt of timing error control signals, as start_read signals, or read-control signals, generated by and from the CSM circuit 406 to trigger the start of reading the stored data out of the Equalizer Buffer circuit 410. If at Step 510 the timing error control signals, i.e. Read-Control signals, are detected, the process proceeds to Step 512. At Step 512, the timing error control signals, i.e. Read-Control signals, generated by the CSM circuit 406 are then received by the Equalizer Buffer circuit 410. The generating of the timing error control signals by the CSM circuit 406 enable synchronizing a reading out of the stored input data based on a timing difference between the timing error control signals and the frame timing synchronization control signals to adjust for an arbitrary delay in processing the input data, such as introduced by processing in the CSM circuit 406, for example.

If, at Step 512, the Equalizer Buffer circuit 410 receives the timing error control signals generated by the CSM circuit 406 (at Step 508), the Equalizer Buffer circuit 410 at Step 514 begins reading the stored data from the Equalizer Buffer circuit 410 and, at Step 516 synchronizes the reading out of the stored input data based on a timing difference between the timing error control signals received from the CSM circuit 406 and the frame timing synchronization control signals received from the UWP circuit 408. If, at Step 510, it is determined that the timing error control signals, i.e. Read-Control signals, are not received by the Equalizer Buffer circuit 410, the process returns to either Step 506 to continue storing input data in the Equalizer Buffer circuit 410 or, alternatively, to Step 502 to receive input data signals and, depending upon receipt of the frame timing synchronization control signals at Step 504, begin storing, or not storing, the received input data in the Equalizer Buffer circuit 410, as described. When the Equalizer Buffer circuit 410 receives the timing error control signals, as start read command signals, from the CSM circuit 406, the Equalizer Buffer circuit 410 starts pushing out, or reading out, data out from the Equalizer Buffer circuit 410. The corresponding error adjusted valid control signals (eq_err_valid), received by the Equalizer Buffer circuit 410 from the CSM circuit 406, indicate the error adjusted frame timing synchronization control signal pulses (eq_err_sync) are valid for the corresponding data frames, and the error adjusted valid control signal pulses (eq_err_valid) are also read enable control signals (rd_en) to enable reading out from the Equalizer Buffer circuit 410 corresponding frames of stored data.

Therefore, the generated the error adjusted frame timing synchronization control signal pulses (eq_err_sync) as validated by the generated error adjusted valid control signal pulses (eq_err_valid) are used to adjust for the arbitrary delay, introduced through processing the input data, such as from processing in the CSM circuit 406, between input data samples and error samples for the input data, in conjunction with the generated frame timing synchronization control signal pulses (rrc_frm_sync) from the UWP circuit 408, to provide a timing difference for synchronization of the error samples and data samples, as well as to enhance adjusting phase and frequency estimation for carrier recovery and frame-timing recovery, in processing data signals received in a continuous mode, as well as in a burst mode, of data signal transmission.

Also, the adjustment for the arbitrary delay in processing the input data, such as resulting from processing in the CSM circuit 406, by the error adjusted frame timing synchronization control signal pulses (eq_err_sync) as validated by the error adjusted valid control signal pulses (eq_err_valid) in conjunction with the frame timing synchronization control signal pulses (rrc_frm_sync) enable the first, and subsequent, data frames written into the Equalizer Buffer circuit 410, to correspond to the first, and subsequent, data frames that result from processing in the CSM circuit 406. Therefore, according to aspects of the invention, it typically does not matter as to the amount of the arbitrary delay introduced by processing in the CSM circuit 406, in that the first, and subsequent, input data written in the Equalizer Buffer circuit 410 and the error adjusted frame timing synchronization control signal pulses (eq_err_sync) as a start read of the corresponding frames of data, will be aligned to enable relatively accurate data read out from the Equalizer Buffer circuit 410.

However, according to aspects of the invention, the Equalizer Buffer circuit 410, which can include a plurality of storage buffers or other storage media, should typically have sufficient storage capacity for the received data to accommodate or store the input data for a worst case, or maximum, delay that possibly could occur by the data processing, such as by processing in the CSM circuit 406. According to aspects of the invention, the Equalizer Buffer circuit 410 is typically at least as large in storage capacity to accommodate such maximum amount of the arbitrary delay. But any arbitrary delay below such maximum delay, the Equalizer Buffer circuit 410 should typically be able to handle the data storage to adjust for the arbitrary delay. Typically, for example, in satellite communications systems in a continuous mode of data transmission, the range of variable range delay can typically be between 1 mega symbols per second to 225 mega symbols per second, although the range of variable delay in relation to sufficient storage capacity to accommodate such maximum amount of the arbitrary delay should not be construed in a limiting sense. Also, according to aspects of the invention, the apparatus and methods described with reference to FIG. 4, such as the Equalizer Buffer circuit 410, can be designed of sufficient storage capacity to accommodate this range of, or other pre-determined range of, variable, arbitrary delay and, according to aspects of the invention, and can desirably accommodate a maximum amount of the arbitrary delay between the input data samples and the error samples resulting from the signal processing of the input data in the continuous mode, or a burst mode, of data signal transmission.

To facilitate the above described synchronization, as discussed, the UWP circuit 408 generates, according to aspects of the invention, the frame timing synchronization control signal pulses (rrc_frm_sync). These rrc_frm_sync control signal pulses represent the times when the first, and subsequent, input data samples to the Equalizer Filter circuit 404 are valid and are start_write commands for writing the input data into the Equalizer Buffer circuit 410. In addition, as previously described, the CSM circuit 406 generates the timing error control signal pulses, the error adjusted frame timing synchronization control signal pulses (eq_err_sync) for the first and corresponding error samples of each frame on the data signal. An example flow process of the synchronization of the error samples and data samples in view of the arbitrary delay introduced in the data signal processing, such as by processing in the CSM circuit 406, according to aspects of the invention, is described as follows as to the error adjusted valid control signal pulses (eq_err_valid) the error adjusted frame timing synchronization control signal pulses (eq_err_sync) and the frame timing synchronization control signal pulses (rrc_frm_sync).

1. At reset, the Equalizer FIR filter circuit 404's input data buffer, i.e., Equalizer Buffer circuit 410, is idle. Even if rrc_sym and rrc_valid pulses are being generated from the RRC circuit 402b of receiver circuit 402, these data samples are being ignored.
2. When the UWP circuit 408 enters a tracking mode, it starts generating the frame timing synchronization control signal pulses (rrc_frm_sync) coincident with the first, and subsequent, samples of data frames.
3. When the Equalizer Buffer circuit 410 receives the frame timing synchronization control signal pulses (rrc_frm_sync) it starts loading the input data samples into the Equalizer Buffer circuit 410. The first, and subsequent, frame timing synchronization control signal pulses (rrc_frm_sync) become the start_write commands for writing and storing corresponding input data into the Equalizer Buffer circuit 410.
4. When the CSM circuit 406 is done with processing a data segment, it also starts to determine the error samples. The CSM circuit 406 also starts generating the error adjusted valid control signal pulses (eq_err_valid) and the error adjusted frame timing synchronization control signal pulses (eq_err_sync) coincident with the first, and subsequent, corresponding error samples of each of the corresponding data frames.
5. When the Equalizer Buffer circuit 410 receives the first, and subsequent, error adjusted frame timing synchronization control signal pulses (eq_err_sync) as validated by the error adjusted valid control signal pulses (eq_err_valid) the Equalizer Buffer circuit 410 starts extracting data from the Equalizer Buffer circuit 410 and performing the LMS adaptation with the error samples received at that time. The first, and subsequent, error adjusted frame timing synchronization control signal pulses (eq_err_sync) become the corresponding start_read commands for the Equalizer Buffer circuit 410.

The exemplary above described flow process of the synchronization of the error samples and data samples in view of the arbitrary delay introduced in the data signal processing, such as by processing in the CSM circuit 406, according to aspects of the invention, advantageously ensures that no matter what arbitrary delay in data processing is introduced between the Equalizer Buffer circuit 410 input data and the error samples, they effectively will be lined up relatively correctly for further data processing, such as to perform the least mean squares (LMS) adaptation, when the stored input data is extracted from the Equalizer Buffer circuit 410. Also, as mentioned herein, the input data buffer, e.g., the Equalizer Buffer circuit 410, should typically be large enough in storage capacity to support storage of input data corresponding to the largest known delay between the input samples and error samples, according to aspects of the invention.

Continuing with reference to FIG. 4, according to exemplary embodiments, the demodulator 400 further includes a tap gradient update circuit 412, such as including the least mean squares (LMS) Tap Update circuit 412, for example. Also, continuing with reference to FIG. 5, where, at Step 508, the CSM circuit 406 generates the timing error control signals, and, at Step 512, the Equalizer Buffer circuit 410 receives the timing error control signals, the CSM circuit 406, at Step 518, also generates equalizer error signals (eq_error_tap), used to implement a Tap adjustment for adjusting a Tap gradient to correspond to the read out data in processing the input data. At Step 518, the CSM circuit 406 generates the equalizer error signals based upon the mapping by the CSM circuit 406 of the channel equalized symbols of data, eq_data, for the input data.

The Tap Update circuit 412 receives the generated equalizer error signals (eq_error_tap), from the CSM circuit 406 and, based thereon, the Tap Update circuit 412 generates corresponding Tap adjustments to adjust the Tap gradient to correspond to the read out data in processing the input data in conjunction with the frame timing synchronization of the input data to adjust and compensate for the arbitrary delay in processing the input data in the input data stream transmitted in the continuous mode, as well as in the burst mode, of data signal transmission. And, in accordance with exemplary embodiments, the Equalizer FIR filter circuit 404 receives the generated Tap gradient from the LMS Tap Update circuit 412 and implements the Tap adjustment. From Step 518, the process proceeds to END upon reading out the stored data from the buffer circuit, such as Equalizer Buffer circuit 410, which was received in the input data stream. As input data signals are received, such as by the demodulator 400, the process again goes to Step 502 and proceeds as previously described.

As discussed herein, according to aspects of the invention, in the demodulator 400 of FIG. 4, both the CSM circuit 406 and the UWP circuit 408 can act on the channel equalized symbols generated by the Equalizer Filter circuit 404. As such, better unique word (UW) detection for frame timing is promoted; and the demodulator typically can better maintain lock after acquisition. Further, relatively better estimation for phase and frequency offsets is promoted and, therefore, relatively better carrier recovery is enhanced.

Figure 6:
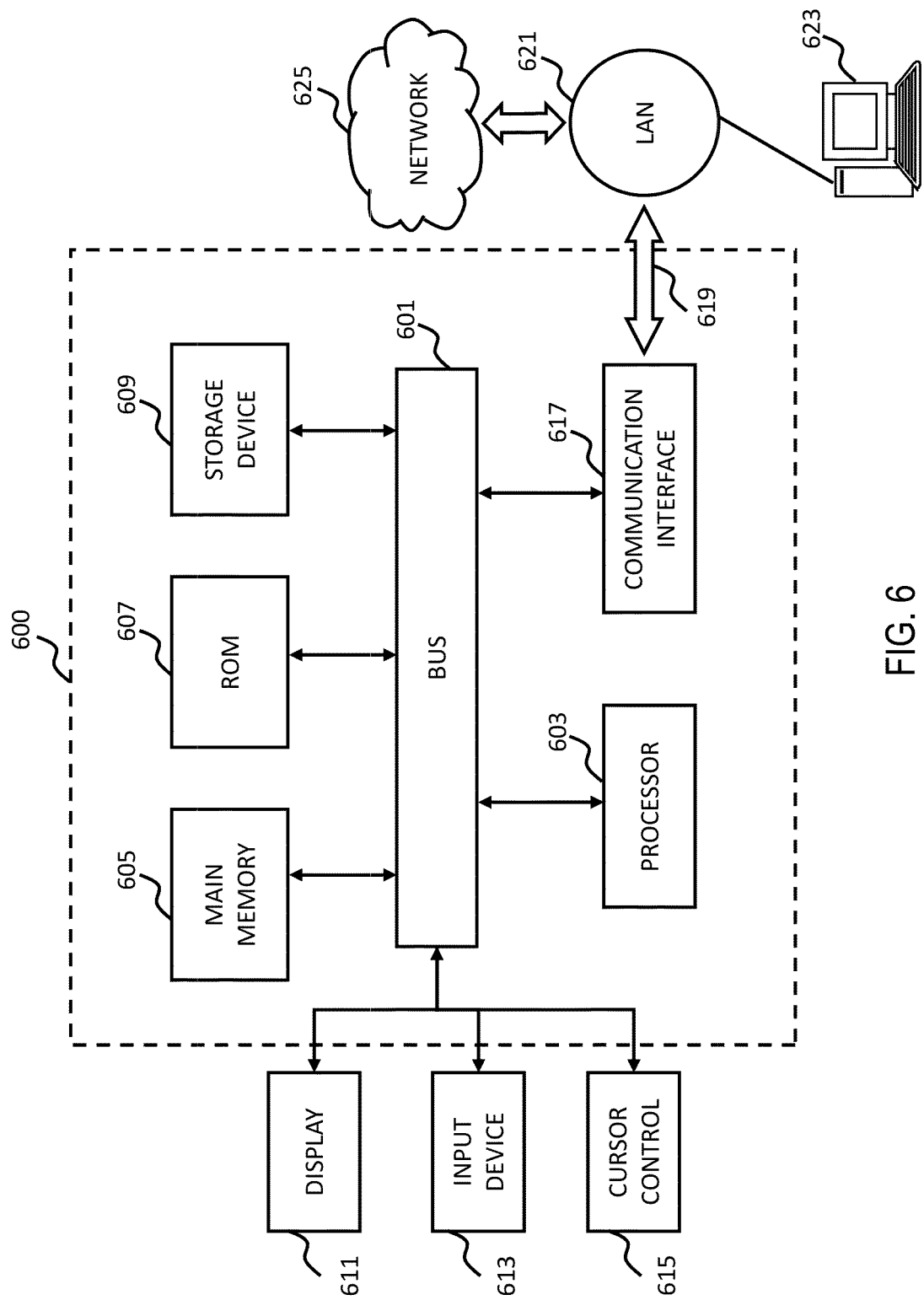
FIG. 6 depicts a block diagram of a computer system on which architectures, apparatus and methods can be implemented, in accordance with exemplary embodiments.

FIG. 6 illustrates a computer system upon which exemplary embodiments according to aspects of the invention can be implemented in relation to synchronizing error samples and data samples to adjust for an arbitrary delay in processing between input data samples and error samples for the input data, as well as to enhance adjusting phase and frequency estimation for carrier recovery and frame-timing recovery, in processing data signals received in a continuous mode, as well as in a burst mode, of data signal transmission in a communications system, such as in a satellite communications system or a computer network communications system.

The computer system 600 includes a bus 601 or other communications mechanism for communicating information, and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions to be executed by the processor 603. The computer system 600 further includes a read only memory (ROM) 607 or other static storage device coupled to the bus 601 for storing static information and instructions for the processor 603. A storage device 609, such as a magnetic disk or optical disk, is additionally coupled to the bus 601 for storing information and instructions.

The computer system 600 can be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is cursor control 615, such as a mouse, a trackball, or cursor direction keys for communicating direction information and command selections to the processor 603 and for controlling cursor movement on the display 611.

According to embodiments and aspects of the invention, dynamic and flexible architectures and methods for synchronizing error samples and data samples to adjust for an arbitrary delay in processing between input data samples and error samples for the input data, as well as to enhance adjusting phase and frequency estimation for carrier recovery and frame-timing recovery, in processing data signals received in a continuous mode, as well as in a burst mode, of data signal transmission, such as in a satellite communications system or a computer network communications system, in accordance with exemplary embodiments and aspects of the invention, can be implemented in conjunction with computer system 600 in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the processes, according to aspects of the inventions described herein. One or more processors in a multi-processing arrangement can also be employed to execute the instructions contained in main memory 605. In alternative embodiments, hard-wired circuitry can be used in place of or in combination with software instructions to implement various embodiments and aspects of the invention. Thus, embodiments of the invention are not limited to any specific combination of hardware circuitry and software.

The computer system 600 also includes a communications interface 617 coupled to bus 601. The communications interface 617 provides a two-way data communications coupling to a network link 619 connected to a local network 621. For example, the communications interface 617 can be a digital subscriber line (DSL) card or modem, an integrated services digital network (ISDN) card, a cable modem, or a telephone modem to provide a data communications connection to a corresponding type of telephone line. As another example, communications interface 617 can be a local area network (LAN) card (e.g. for Ethernet™ or an Asynchronous Transfer Model (ATM) network) to provide a data communications connection to a compatible LAN. Wireless links can also be implemented. In any such implementation, communications interface 617 sends and receives electrical, electromagnetic, or optical signals that carry digital data streams representing various types of information. Further, the communications interface 617 can include peripheral interface devices, such as a Universal Serial Bus (USB) interface, a PCMCIA (Personal Computer Memory Card International Association) interface, etc.

The network link 619 typically provides data communications through one or more networks to other data devices. For example, the network link 619 can provide a connection through local network 621 to a host computer 623, which has connectivity to a network 625 (e.g. a wide area network (WAN) or the global packet data communications network now commonly referred to as the "Internet") or to data equipment operated by service provider. The local network 621 and network 625 both use electrical, electromagnetic, or optical signals to convey information and instructions. The signals through the various networks and the signals on network link 619 and through communications interface 617, which communicate digital data with computer system 600, are exemplary forms of carrier waves bearing the information and instructions.

The computer system 600 can send messages and receive data, including program code, through the network(s), network link 619, and communications interface 617. In the Internet example, a server (not shown) might transmit requested code belonging to an application program for implementing embodiments of the invention through the network 625, local network 621 and communications interface 617. The processor 603 can execute the transmitted code while being received and/or store the code in storage device 609, or other non-volatile storage for later execution. In this manner, computer system 600 can obtain application code in the form of a carrier wave.

The term "computer-readable medium" as used herein refers to any medium that participates in providing instructions to the processor 603 for execution. Such a medium can take many forms, including but not limited to non-volatile media, volatile media, and transmission media. Non-volatile media include, for example, optical or magnetic disks, such as storage device 609. Volatile media include dynamic memory, such as main memory 605. Transmission media include coaxial cables, copper wire and fiber optics, including the wires that comprise bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media can be involved in providing instructions to a processor for execution. For example, the instructions for carrying out at least part of the aspects of the invention can initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 7 illustrates a chip set 700 in which embodiments and aspects of the invention can be implemented such as, for example, in circuits, modules and elements of a demodulator (e.g., such as used in conjunction with the demodulator 400 of FIG. 4), for synchronizing error samples and data samples to adjust for an arbitrary delay in processing between input data samples and error samples for the input data, as well as to enhance adjusting phase and frequency estimation for carrier recovery and frame-timing recovery, in processing data signals received in a continuous mode, as well as in a burst mode, of data signal transmission in a communications system, such as in a satellite communications system or a computer network communications system.

Chip set 700 includes, for instance, processor and memory components described with respect to FIG. 7 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 700 includes a communications mechanism, such as a bus 701, for passing information among the components of, and to and from, the chip set 700. A processor 703 has connectivity to the bus 701 to execute instructions and process information stored in, for example, a memory 705. The processor 703 can include one or more processing cores with each core configured to perform independently. A multi-core processor enables multiprocessing within a single physical package. Examples of a multi-core processor include two, four, eight, or greater numbers of processing cores. Alternatively, or in addition, the processor 703 can include one or more microprocessors configured in tandem via the bus 701 to enable independent execution of instructions, pipelining, and multithreading. The processor 703 can also be accompanied with one or more specialized components to perform certain processing functions and tasks such as one or more digital signal processors (DSP) 707, and/or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM) and static memory (e.g., ROM) for storing executable instructions that, when executed by the processor 703 and/or the DSP 707 and/or the ASIC 709, perform the processes of exemplary embodiments and aspects of the invention, such as described herein. The memory 705 also stores the data associated with or generated by the execution of the processes.

The methods, apparatus and aspects of the invention can be applied to various communications networks, such as, for example, high capacity computer, wireless or satellite networks, and promotes equalization of incoming data signals, and provides for synchronizing error samples and data samples to adjust for an arbitrary delay in processing between input data samples and error samples for the input data, as well as to enhance adjusting phase and frequency estimation for carrier recovery and frame-timing recovery, in processing data signals received in a continuous mode, as well as in a burst mode, of data signal transmission. Such equalization and synchronization of input data received for processing, according to aspects of the invention, promotes improved accuracy in the received signals, effectively maintaining a lock on the data signals after acquisition of the signals for processing, and minimizing degrading the accuracy of phase and frequency estimation for the signal processing, as well as promotes addressing phase and amplitude distortions at a relatively reasonable cost for data reception and processing in a continuous mode, or a burst mode, of data signal transmission. Thus, the exemplary references and illustrations in relation to Digital Video Broadcasting, Second Generation (DVB-S2) satellite communications systems and DVB-S2 type demodulators, or receivers, for example, to describe or illustrate embodiments and aspects of the invention, should not be construed in a limiting sense. Also, various aspects of the invention, and of the exemplary methods and apparatus described herein, can be implemented in the Jupiter Satellite System and its variants, for example.

In the preceding specification, various exemplary embodiments and aspects of the invention have been described with reference to the accompanying drawings. It will, however, be evident that various modifications and changes can be made thereto, and additional embodiments can be implemented, without departing from the broader scope of the invention as set forth in the claims that follow. The specification and drawings are accordingly to be regarded in an illustrative rather than restrictive sense.

What is claimed is:

1. A method, comprising:
receiving an input data stream, transmitted over a channel of a communications system, wherein the input data stream comprises a stream of frames of input data prior to being demodulated and decoded to regenerate an original source data stream;
equalizing the input data to generate equalized data;
generating frame timing synchronization control signals; and storing the input data based on the generated frame timing synchronization control signals;
performing carrier synchronization processing based on the equalized data, which includes generating associated timing error control signals based at least in part on a processing delay corresponding to the carrier synchronization processing; and
synchronizing the stored input data by reading the input data out of storage based on the timing error control signals to adjust for the processing delay.

2. A method according to claim 1, wherein the timing error control signals comprise error adjusted frame timing synchronization control signals provided to the storage as read control signals and error adjusted valid control signals provided to the storage as read enable signals for the synchronization of the stored input data to adjust for the processing delay.

3. A method according to claim 2, wherein the equalizing of the input data comprises filtering the input data, and the performing carrier synchronization processing further includes generating equalizer error signals, and wherein the method further comprises:
generating tap gradient signals; and
adjusting filter taps for the filtering of the input data based at least in part on the equalizer error signals.

4. A method according to claim 1, wherein the generation of the frame timing synchronization control signals comprises ascertaining frame timing by locating instances of unique word data, each instance indicating a start of a new input data frame.

5. A method, comprising:
receiving an input data stream, transmitted over a channel of a communications system, wherein the input data stream comprises a stream of frames of input data prior to being demodulated and decoded to regenerate an original source data stream; and
demodulating the received input data, wherein the demodulation of the received input data comprises:
equalizing the input data to generate equalized data
generating frame timing synchronization control signals; and storing the input data based on the generated frame timing synchronization control signals;
performing carrier synchronization processing based on the equalized data, which includes generating associated timing error control signals based at least in part on a processing delay corresponding to the carrier synchronization processing; and synchronizing the stored input data by reading the input data out of storage based on the timing error control signals to adjust for the processing delay.

6. A method according to claim 5, wherein the equalizing of the input data comprises filtering the input data, and the performing carrier synchronization processing further includes generating equalizer error signals, and wherein the demodulating the received input data further comprises:
generating tap gradient signals; and
adjusting filter taps for the filtering of the input data based at least in part on the equalizer error signals.

7. A method according to claim 6, wherein the timing error control signals comprise error adjusted frame timing synchronization control signals provided to the storage as read control signals and error adjusted valid control signals provided to the storage as read enable signals for the synchronization of the stored input data to adjust for the processing delay.

8. A method according to claim 7, wherein the input data stream is transmitted in a continuous mode of data transmission.

9. A method according to claim 7, wherein the input data stream is transmitted in a burst mode of data transmission.

10. A method according to claim 5, wherein demodulating the received input data further comprises formatting the input data into a parallelized format, and the demodulating the received input data is performed in a parallel processing manner.

11. A method according to claim 5, wherein demodulating the received input data further comprises formatting the input data into a plurality of data segments.

12. A method according to claim 5, wherein the demodulation of the received input data comprises a DVB-S2 type demodulation.

13. A method according to claim 5, wherein storing the input data includes providing storage capacity to account for a maximum amount of the processing delay.

14. A method according to claim 5, wherein the input data stream is transmitted in a burst mode of data transmission.

15. A method according to claim 5, wherein the input data stream is transmitted in a continuous mode of data transmission.

16. A method according to claim 5, wherein the generation of the frame timing synchronization control signals comprises ascertaining frame timing by detecting instances of unique word, each instance indicating a start of a new input data frame.

17. An apparatus, comprising:
a receiver module configured to receive an input data stream, transmitted over a channel of a communications system, wherein the input data stream comprises a stream of frames of input data prior to being demodulated and decoded to regenerate an original source data stream;
an equalizer module configured to process the input data and generate equalized data;
a buffer module configured to store the input data;
a processor module configured to generate frame timing synchronization control signals, wherein the input data is stored in the buffer module based at least in part on the frame timing synchronization control signals; and
a synchronization module configured to perform carrier synchronization processing based on the equalized data, which includes generating associated timing error control signals based at least in part on a processing delay, corresponding to the carrier synchronization processing; and wherein the buffer module is further configured to synchronize the stored input data by outputting the input data based on the timing error control signals to adjust for the processing delay.

18. An apparatus according to claim 17, wherein the equalizer module comprises a filter and the carrier synchronization processing further includes generating equalizer error signals, the apparatus further comprising:
a tap update module configured to generate tap gradient signals, and
wherein the equalizer module is further configured to adjust filter taps based on the equalizer error signals and to generate the equalized data by filtering the input data based at least in part on the filter taps.

19. An apparatus according to claim 18, wherein the apparatus comprises a System-on-Chip DVB-S2 type demodulator for a satellite communications system.

20. An apparatus according to claim 18, wherein the timing error control signals comprise error adjusted frame timing synchronization control signals provided to the buffer module as read control signals and error adjusted valid control signals provided to the buffer module as read enable signals for the synchronization of the stored input data to adjust for the processing delay.

21. An apparatus according to claim 18, wherein the buffer module includes storage capacity for storage of the input data to account for the delay.

22. An apparatus according to claim 17, wherein the processor module comprises a unique word processor configured to generate of the frame timing synchronization control signals by detecting instances of unique word data, each instance indicating a start of a new frame.

23. An apparatus, comprising:
a demodulator configured to demodulate input data, the demodulator comprising:
a receiver module configured to receive an input data stream, transmitted over a channel of a communications system, wherein the input data stream comprises a stream of frames of input data prior to being demodulated and decoded to regenerate an original source data stream;
an equalizer module configured to process the input data and generate equalized data;
a buffer module configured to store the input data;
a frame timing processor configured to generate frame timing synchronization control signals, wherein the frame timing synchronization control signals synchronize writing the input data into the buffer module; and
a synchronization module configured to generate timing error control signals based at least in part on a processing delay; and
wherein the buffer module is further configured to synchronize the stored input data by outputting the input data based on the timing error control signals to adjust for the processing delay.

24. An apparatus according to claim 23, wherein the demodulator comprises a System-on-Chip DVB-S2 type demodulator for a satellite communications system.

25. An apparatus according to claim 23, wherein the buffer module includes storage capacity for storage of the input data to account for the delay.

26. An apparatus according to claim 23, wherein the buffer module includes a predetermined storage capacity for storage of the input data to account for a maximum level of the processing delay.

27. An apparatus according to claim 23, wherein the equalizer module comprises a filter and the carrier synchronization module is further configured to generate equalizer error signals, and wherein the demodulator further comprises:
- a tap update module configured to generate tap gradient signals, and
- wherein the equalizer module is further configured to adjust filter taps based on the equalizer error signals and to generate the equalized data by filtering the input data based at least in part on the filter taps.

28. An apparatus according to claim 27, wherein the demodulator comprises a DVB-S2 type demodulator, the filter comprises a finite impulse response (FIR) equalizer filter, the frame timing processor comprises a unique word processor (UWP), the synchronization module comprises a carrier synchronization module (CSM), the buffer module comprises an equalizer buffer, and the tap update module comprises a least mean squares (LMS) tap update module.

29. An apparatus according to claim 23, wherein the receiver module comprises a front-end-signal processing module and a root-raised-cosine filter (RRC) module.

30. An apparatus according to claim 23, wherein the demodulator is configured to process the input data by formatting the input data into a plurality of data segments.

31. An apparatus according to claim 23, wherein the demodulator is configured to process the input data by formatting the input data into a parallelized format, and the demodulation of the received input data is performed in a parallel processing manner.

32. An apparatus according to claim 23, wherein the input data stream is transmitted in a burst mode of data transmission.

33. An apparatus according to claim 23, wherein the input data stream is transmitted in a continuous mode of data transmission.

34. An apparatus according to claim 23, wherein the timing error control signals comprise error adjusted frame timing synchronization control signals provided to the buffer module as read control signals and error adjusted valid control signals provided to the buffer as read enable signals for the synchronization of the stored input data to adjust for the processing delay.

35. An apparatus according to claim 23, wherein the frame timing processor comprises a unique word processor configured to generate of the frame timing synchronization control signals by detecting instances of unique word data, each instance indicating a start of a new frame.

* * * * *